US012186266B2

(12) United States Patent
Desbrosses et al.

(10) Patent No.: US 12,186,266 B2
(45) Date of Patent: Jan. 7, 2025

(54) MULTI-CHAMBER BAG FOR PARENTERAL NUTRITION SOLUTIONS

(71) Applicants: Baxter International Inc., Deerfield, IL (US); Baxter Healthcare SA, Glattpark (CH)

(72) Inventors: Freddy Desbrosses, Thuin (BE); Pierpaola Padula, Etterbeek (BE); Jean-Claude Bezin, Lessines (BE); Marin Demulier, Jumet (BE)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 440 days.

(21) Appl. No.: 17/543,933

(22) Filed: Dec. 7, 2021

(65) Prior Publication Data

US 2023/0172806 A1 Jun. 8, 2023

(51) Int. Cl.

| | |
|---|---|
| ***A61J 1/10*** | (2006.01) |
| ***A61J 1/14*** | (2023.01) |
| ***A61J 1/20*** | (2006.01) |

(52) U.S. Cl.

CPC ............... *A61J 1/10* (2013.01); *A61J 1/1475* (2013.01); *A61J 1/2024* (2015.05); *A61J 1/2058* (2015.05)

(58) Field of Classification Search

CPC .......... A61J 1/2093; A61J 1/10; A61J 1/2024; A61J 1/1475

See application file for complete search history.

(56) References Cited

U.S. PATENT DOCUMENTS

| | | | |
|---|---|---|---|
| 5,267,646 A | 12/1993 | Inoue et al. |
| 2005/0194060 A1 | 9/2005 | Houwaert et al. |

(Continued)

FOREIGN PATENT DOCUMENTS

| | | | |
|---|---|---|---|
| EP | 790051 A2 | 8/1997 |
| EP | 2080501 A1 | 7/2009 |
| WO | 1997037628 A1 | 10/1997 |

OTHER PUBLICATIONS

1 International Search Report for Application No. PCT/US2022/080970 dated Apr. 4, 2023 (4 pages).

(Continued)

*Primary Examiner* — Susan S Su
*Assistant Examiner* — Meagan Ngo
(74) *Attorney, Agent, or Firm* — K&L Gates LLP

(57) ABSTRACT

A flexible multi-chamber bag for storing and reconstituting parenteral nutrition solutions is disclosed. The flexible multi-chamber bag comprises a first peelably sealing wall and a second peelably sealing wall between the two polymer films extending from the top edge to the bottom edge and separating the first bag into a first chamber between the first peelably sealing wall and the second peelably sealing wall, a first space between the left edge and the first peelably sealing wall, a second space between the second peelably sealing wall and the right edge; a third peelably sealing wall extending from the left edge to the first peelably sealing wall to separate the first space to form a third chamber and a fourth chamber; and a fourth peelably sealing wall extending from the right edge to the second peelably sealing wall to separate the second space to form a second chamber and a fifth chamber.

26 Claims, 12 Drawing Sheets

(56) References Cited

U.S. PATENT DOCUMENTS

| | | | | |
|---|---|---|---|---|
| 2007/0031976 | A1* | 2/2007 | Trouilly | A61K 45/06 436/1 |
| 2009/0166363 | A1 | 7/2009 | Balteau | |
| 2010/0280485 | A1* | 11/2010 | Choi | C08L 23/10 428/517 |
| 2010/0318058 | A1* | 12/2010 | Schroder | A61J 1/2093 604/410 |
| 2012/0310150 | A1* | 12/2012 | Brandl | A61M 1/1656 604/410 |
| 2013/0039606 | A1 | 2/2013 | Pittet et al. | |
| 2013/0281964 | A1* | 10/2013 | Kugelmann | B65D 33/14 604/410 |
| 2014/0175126 | A1* | 6/2014 | Carlsson | A61M 39/10 222/145.5 |
| 2016/0000652 | A1 | 1/2016 | Rose | |
| 2021/0212936 | A1* | 7/2021 | Trouilly | A61K 47/10 |

OTHER PUBLICATIONS

International Preliminary Report on Patentability for Application No. PCT/US2022/080970 dated Feb. 20, 2024 (8 pages).

* cited by examiner

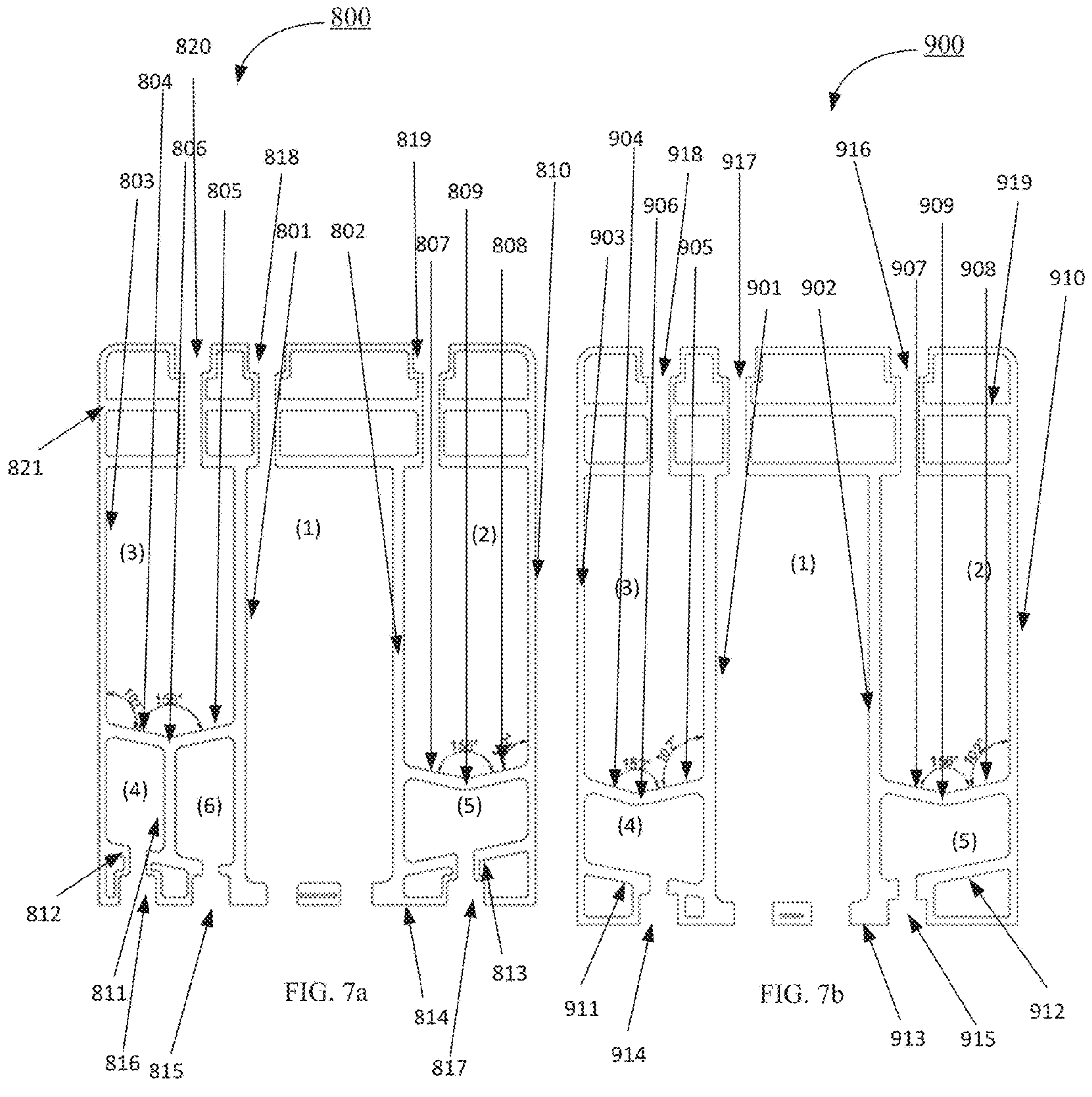
FIG. 7 (FIG. 7a and FIG. 7b)

MULTI-CHAMBER BAG FOR PARENTERAL NUTRITION SOLUTIONS

TECHNICAL FIELD

The disclosure is directed to a flexible multi-chamber peelable bag (a multi-chamber bag (MCB) having peelably sealing walls) that allows an easy, straightforward and risk-free reconstitution of the mixture, to be used for storing ready-to-infuse Parenteral Nutrition solutions including both macronutrients, micronutrients, and electrolytes. The disclosure is also directed to parenteral nutrition products comprising the parenteral nutrition formulation reconstituted from such a flexible multi-chamber peelable bag. More specifically, the present disclosure is directed to a MCB comprising peelably sealing walls separating a single bag into at least five chambers containing a carbohydrate formulation in a first chamber, an amino acid formulation in a second chamber, a lipid formulation in a third chamber, a fourth chamber comprising a vitamin formulation and a fifth chamber comprising a trace element formulation, wherein the carbohydrate formulation, amino acid formulation and/or the lipid formulation may also contain certain vitamins and certain trace elements that can be stably accommodated therein. Once activated, the peelably sealing walls can be removed and the formulations from the different chambers can be mixed to form one single solution. Thus, the disclosure also relates to the use of the parenteral nutrition formulation for providing total parenteral nutrition to a patient without having to add further components such as vitamins or trace elements to the parenteral formulation before administration to meet the clinical guidelines for parenteral nutrition.

BACKGROUND AND DESCRIPTION OF THE RELATED ART

Flexible multi-chamber containers made from polymer films, for storing and keeping separated parenteral nutrition solutions are widespread. For mixing the compartments of said containers, several materials and methods for producing peelable seals (peelable heat-sealed welds) have been developed.

Unlike permanently welded seals, peelable seals can be ruptured by applying pressure on the container chambers (rolling the container or pressing on one of the chambers) however the peelable seal strength should be high enough for production and transport and still low enough to easily open the bag.

Three-Chamber peelable bags (3CBs) containing macronutrients (lipids, amino acids, and dextrose) and electrolytes are widely used. However, only a few multi-chamber bag products containing vitamins and/or trace elements are existing, and no product is existing containing all the macronutrients, electrolytes, and all recommended micronutrients (vitamins and trace elements).

In the majority of the cases, micronutrients are added in the bag containing macronutrients through the available medication port before administration. This process of supplementation is time-consuming and requires the use of syringes needles, increasing risk of errors or contamination especially when not made under aseptic conditions.

Three-Chambers peelable bags containing macronutrients (lipids, amino acids, and dextrose) and electrolytes are widely used and also MCBs with more than three chambers have been described in the prior art, see, for example, EP 2 080 501 A1 or U.S. Pat. No. 5,267,646 A. However, only a few multi-chamber bag products containing vitamins and/or trace elements are existing, and no product is existing containing all the macronutrients, electrolytes, and all recommended micronutrients (vitamins and trace elements).

It is a challenge to provide a MCB with at least five chambers for accommodating said complete set of macronutrients and micronutrients, wherein the volume of at least two of the chambers is significantly lower than that of the remaining chambers and which still fulfills all requirements of a MCB. Specifically, the peelable sealing walls must be both stable enough so the walls do not break or start to leak during handling, including filling, sterilization, transport, and storage, and still allow an easy, single-step activation or reconstitution of the bag without the additional risk of incomplete activation (FIG. 2). This is specifically challenging due to the combination of chambers having very different volumes as the pressure exerted on the peelable seals by the large volume chambers, generally containing the macronutrients, is higher than that of the small volume chambers, generally containing the micronutrients.

It is also a challenge to design such MCB in a way that an undesired early mixing between two formulations that could lead to stability issues is avoided. For example, high concentrated glucose or acidic trace element formulations should not be mixed with the lipid emulsion formulation and/or the vitamin formulation for stability reasons but should be admixed only in one step together with the buffered amino acid solution.

Accordingly, a very careful design of a MCB according to the invention is required to address all of the above challenges.

A multi-chamber container that allows for the stable and safe accommodation of all recommended macronutrients, micronutrients, and electrolytes in the adequate doses as disclosed herein and which can be terminally heat sterilized, stored under standard conditions and can finally be reconstituted in a one-step and mistake-proof way would have several advantages:

- eliminating microbiological contamination associated with micronutrient addition;
- eliminating medication errors associated with micronutrient addition;
- decreasing PN preparation by eliminating the time required for micronutrient addition;
- reducing needle stick injuries (i.e., associated with micronutrient addition);
- eliminating PN waste associated with micronutrient addition (e.g. vitamin and TE vials, diluent, and disposables);
- simplifying logistics supply chain, and storage management for hospitals and patients.

Accordingly, there is a significant need to provide a multi-chamber container for a ready-to-use, all-in-one parenteral nutrition product which is designed for accommodating several solutions comprising all macronutrients, electrolytes and micronutrients to meet the clinical guidelines for parenteral nutrition, thereby avoiding the compounding of or manual combination of formulations, or the addition of vitamins and trace elements to a product before administration. To date, the MCB with a full set of required macro- and micronutrients cannot together be stably accommodated in terminally heat-sterilized parenteral nutrition products because of issues of incompatibility and stability of several critical micronutrients especially when terminally heat-sterilized products are sought for. Providing such ready-to-use MCB with product would address ecological issues, enable a safe therapy also for HPN and TPN, and specifically allow to reduce medical risks, which could significantly contribute to advancing today's standard of care. In addition, a multi-chamber container for such product must be carefully designed for the safe and stable accommodation of at least four, five or six different solutions having different volumes during production, sterilization, storage, and transport, and which must be reconstituted before administration in a simple and complete manner in order to avoid difficulties during single-step activation including a potentially incomplete reconstitution.

Providing such ready-to-use MCB with product would address ecological issues, enable a safe and efficient therapy also for HPN and TPN, and specifically allow to reduce medical risks, which could significantly contribute to advancing today's standard of care.

SUMMARY OF THE INVENTION

In one aspect, the present disclosure relates to a flexible multi-chamber bag for storing and reconstituting parenteral nutrition solutions. The flexible multi-chamber bag comprises two polymer films edge-sealed to form a first bag having a top edge, a bottom edge, a left edge and a right edge, wherein the top edge, the bottom edge, the left edge and the right edge are non-peelably sealed; a first plurality of tubes with sidewalls non-peelably sealed between the two polymer films at the top edge to form a first plurality of port tubes; a second plurality of tubes with sidewalls non-peelably sealed between the two polymer films at the bottom edge to form a second plurality of port tubes; a first peelably sealing wall and a second peelably sealing wall between the two polymer films extending from the top edge to the bottom edge and separating the first bag into a first chamber between the first peelably sealing wall and the second peelably sealing wall, a first space between the left edge and the first peelably sealing wall, a second space between the second peelably sealing wall and the right edge; a third peelably sealing wall extending from the left edge to the first peelably sealing wall to separate the first space to form a third chamber and a fourth chamber; and a fourth peelably sealing wall extending from the right edge to the second peelably sealing wall to separate the second space to form a second chamber and a fifth chamber.

In one embodiment, the third peelably sealing wall comprises a fifth peelably sealing wall starting from an inner surface of the left edge and a sixth peelably sealing wall starting from the first peelably sealing wall, and both the fifth peelably sealing wall and the sixth peelably sealing wall connect at a first connection point to form the third peelably sealing wall.

In one embodiment, the left edge and the fifth peelably sealing wall have an angle greater than 90° toward the top edge direction, and the fifth peelably sealing wall and the sixth peelably sealing wall around the first connection point have an angle in the range between 130° and 170°.

In one embodiment, the left edge and the fifth peelably sealing wall have the angle of about 100° toward the top edge direction, and the fifth peelably sealing wall and the sixth peelably sealing wall around the first connection point have an angle in the range between 150° and 160°.

In one embodiment, the left edge and the fifth peelably sealing wall have the angle of 102° toward the top edge direction, and the fifth peelably sealing wall and the sixth peelably sealing wall around the first connection point have an angle of 156°.

In one embodiment, a seventh peelably sealing wall starts from the first connection point and extends to the bottom edge to separate the fourth chamber to form a sixth chamber between the seventh peelably sealing wall and the first peelably sealing wall.

In one embodiment, the fourth peelably sealing wall comprises a eighth peelably sealing wall starting from an inner surface of the right edge and a ninth peelably sealing wall starting from the second peelably sealing wall, and both the eighth peelably sealing wall and the ninth peelably sealing wall connect at a second connection point to form the fourth peelably sealing wall.

In one embodiment, the right edge and the eighth peelably sealing wall have an angle greater than 90° toward the top edge direction, and the eighth peelably sealing wall and the ninth peelably sealing wall around the second connection point have an angle in the range between 130° and 170°.

In one embodiment, the right edge and the eighth peelably sealing wall have the angle of about 100° toward the top edge direction, and the eighth peelably sealing wall and the ninth peelably sealing wall around the second connection point have an angle in the range between 150° and 160°.

In one embodiment, the right edge and the eighth peelably sealing wall have the angle of 102° toward the top edge direction, and the eighth peelably sealing wall and the ninth peelably sealing wall around the second connection point have an angle of 156°.

In one embodiment, at least one of the first chamber, the second chamber and the third chamber connects to the first plurality of port tubes.

In one embodiment, each of the first chamber, the second chamber and the third chamber connects to the first plurality of port tubes.

In one embodiment, at least one of the fourth chamber and the fifth chamber connects to the second plurality of port tubes.

In one embodiment, each of the fourth chamber and the fifth chamber connects to the second plurality of port tubes.

In one embodiment, the first chamber connects to an administration port and/or a medication port at the bottom edge.

In one embodiment, the first chamber connects to both an administration port and a medication port at the bottom edge.

In one embodiment, the flexible multi-chamber bag comprises a first portion near the top edge comprising the first plurality of port tubes, and the first portion is non-peelably sealed and removed from the flexible multi-chamber bag.

In one embodiment, the flexible multi-chamber bag comprises a second portion at the left corner of the flexible multi-chamber bag, the second portion comprises the port tube to the fourth chamber, and the second portion is non-peelably sealed and removed from the flexible multi-chamber bag.

In one embodiment, the flexible multi-chamber bag comprises a third portion at the right corner of the flexible multi-chamber bag, the third portion comprises the port tube to the fifth chamber, and the third portion is non-peelably sealed and removed from the flexible multi-chamber bag.

In another aspect, the present disclosure relates to an "all-in-one" parenteral nutrition system comprising parenteral nutrition solutions in the flexible multi-chamber bag as discussed above. The "all-in-one" parenteral nutrition system comprises the first chamber comprising an amino acids solution; the second chamber comprising a glucose solution; the third chamber comprising a lipid emulsion; the fourth chamber comprising a vitamins solution or emulsion; and the fifth chamber comprising a trace elements solution.

In one embodiment, the first chamber further comprises vitamins or trace elements.

In one embodiment, the second chamber further comprises vitamins or trace elements.

In one embodiment, the third chamber further comprises fat-soluble vitamins.

In one embodiment, each of the first chamber, the second chamber, the third chamber, the fourth chamber and the fifth chamber comprise one port tube for addition of contents into the chambers.

In one embodiment, the port tube for each of the third chamber, the fourth chamber and the fifth chamber is sealed or closed after the addition of the contents into the chambers.

In one embodiment, port-tube-containing portions for the second chamber, the third chamber, the fourth chamber and the fifth chamber are non-peelably sealed and removed from the rest of the flexible multi-chamber bag.

In one embodiment, the flexible multi-chamber bag comprises at least one port tube at the top edge for the first chamber, the second chamber and/or the third chamber.

In one embodiment, a portion comprising the at least one port tube at the top edge for the first chamber, the second chamber and/or the third chamber is non-peelably sealed and removed from the rest of the flexible multi-chamber bag.

In another aspect, the present disclosure relates to a method of manufacturing the "all-in-one" parenteral nutrition system as discussed above. The method comprises: producing the flexible multi-chamber bag, the flexible multi-chamber bag comprising: the first chamber comprising a first port tube; the second chamber comprising a second port tube; the third chamber comprising a third port tube; the fourth chamber comprising a fourth port tube; and the fifth chamber comprising a fourth port tube, wherein the first chamber extends from the top edge of the flexible multi-chamber bag to the bottom edge of the flexible multi-chamber bag; adding an amino acids solution into the first chamber through the first port tube; adding a glucose solution into the second chamber through the second port tube; adding a lipid emulsion into the third chamber through the third port tube; adding a vitamins solution or emulsion into the fourth chamber through the fourth port tube; adding a trace elements solution into the fifth chamber through the fifth port tube; and sealing the first port tube, the second port tube, the third port tube, the fourth port tube and the fifth port tube.

In one embodiment, the method further comprises sealing portions comprising the first port tube, the second port tube, the third port tube, the fourth port tube and the fifth port tube.

In one embodiment, the method further comprises cutting and removing the portions comprising the first port tube, the second port tube, the third port tube, the fourth port tube and the fifth port tube from the flexible multi-chamber bag to form the "all-in-one" parenteral nutrition system.

BRIEF DESCRIPTION OF THE DRAWINGS

FIG. 2 shows that rolling the bag from the top is enough to allow the complete opening of the peel-seals and complete mixing of the five chambers content (see FIGS. 4, 5, 6 and 7 below). With the proposed MCB design the current rolling action for known multi-chamber bags such as Olimel, Numeta, Oliclinomel or Clinomel can be leveraged for the activation of the five-chamber bag in spite of the challenges of having a plurality of chambers with different volumes, thereby guaranteeing a mixing of all compartments with a single operation, while maintaining the user experience unchanged.

FIG. 7 (including FIG. 7*a* and FIG. 7*b*) is a set of schematic diagrams showing designs of certain MCBs with preferred angle geometries. For example, the preferred angles geometry is as follow: the peel seals coming from the hanger side are straight towards the access port side of the bag; at the split location transversal peel seals are going towards the left and right permanent seals; and the shape of these transversal peel seals is such that it forms an obtuse angle (140° to 160°) located, in a preferred embodiment, in the middle of each transversal seal. A rounded shape is another possibility. This obtuse angle (or rounded shape) guarantees a good drainage of the bag even if small portions of the transversal seals along the permanent seals remain close after container activation.

DETAILED DESCRIPTION OF THE INVENTION

Figure 1A:
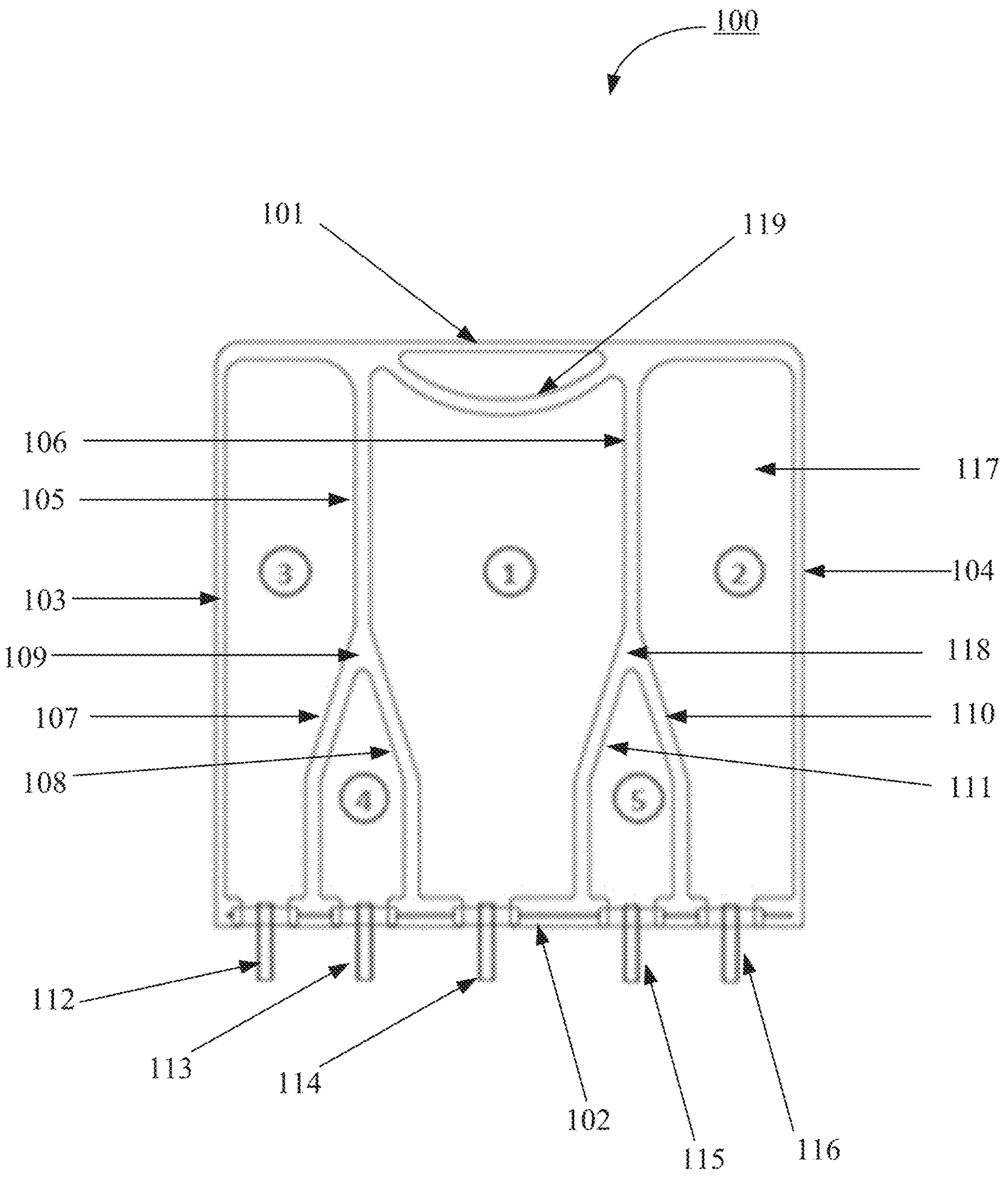
FIG. 1 (including FIG. 1*a*, FIG. 1*b* and FIG. 1*c*) is a set of schematic diagrams showing designs of a multi-chamber bag (MCB) according to the invention, comprising five chambers which contain a carbohydrate formulation (1), an amino acid formulation (2), a lipid formulation (3), a trace element formulation (4) and a vitamin formulation (5). In one embodiment, Chamber (1) includes an amino acids solution optionally containing some vitamins or trace elements; Chamber (2) includes a glucose solution optionally containing some vitamins or trace elements; Chamber (3) includes a lipid emulsion optionally containing fat-soluble vitamins; Chamber (4) includes a vitamins solution or emulsion; and Chamber (5) includes a trace elements solution. The flexible containers of FIG. 1*a* and FIG. 1*b* are made by circumferentially welding two foils being not peelable and furthermore containing peelable welds to separate the five chambers. On the bottom part, tubes of FIGS. 1*a*, 1*b* and 1*c* are sealed between the two foils. Those are used to fill the five chambers with the proper content. Instead of the "V" shaped small chambers 4 and 5 in FIG. 1*a*, FIG. 1*c* has two "U" shaped small chambers 4 and 5.

The present invention generally relates to the field of parenteral nutrition. More particularly, the present invention relates to multi-chamber containers (MCB) for parenteral nutrition that provide a plurality of formulations for administration. The MCB have peelably sealing walls to separate the container into at least four, five or six chambers with small chambers alone or together having the same width as the adjacent large chambers, wherein the design of the chambers allows for both stability of the respective chambers during filling, sterilization, transport and storage and allow a smooth and complete reconstitution of the chamber before administration of the comprised formulations. Accordingly, the MCB enables to safely and efficiently provide a combination of lipids, carbohydrates, amino acids, vitamins and trace elements in a manner that they are ready to be used for administration to a patient and meet the nutritional requirements of current guidelines for parenteral nutrition without further addition of further substances. Related embodiments described herein relate to multi-chamber containers that optionally have a sixth chamber. Further related embodiments relate to the formulations reconstituted from such five or six chamber bags following activating the multi-chamber container by rupturing or removing the peelably sealing walls and their use for parenteral nutrition of patients in need thereof.

Parenteral nutrition products, specifically for total parenteral nutrition, should provide for all macronutrients and micronutrients that allow for a safe and sustainable parenteral nutrition which addresses all the nutritional needs of a patient for whom oral or enteral uptake of nutrients is impossible, insufficient or contraindicated. Today, when providing parenteral nutrition in the form of ready-to-use multi-chamber containers, at least some relevant micronutrients are typically added to nutrition bags before administration because they are not contained in such products. For this purpose, vitamins are, for example, provided in glass vials in the form of lyophilizates or solutions to be reconstituted and/or mixed into the nutrition/infusion bags. Trace elements are also provided in glass vials or polypropylene ampules meant to be mixed into infusion bags prior to administration. Prior to usage, referring to the start of administering the formulation to the patient, the micronutrients are sometimes added to the nutrition solution via the medical port of the container or bag, or are added via a Y-connector to the infusion line. As mentioned before, these processes take time and several handling steps are required, thereby increasing the risk of medication errors and/or bacterial contamination. In addition, significant amounts of waste are generated, such as ampoules, gloves, lines, and syringes that are only needed for the mixing or addition of micronutrients and are then discarded.

To avoid these problems, it would seem a straightforward solution to provide ready-to-use “all-in-one” products that accommodate all relevant macro- and micronutrients products as well as electrolytes. However, it is persistently difficult to stably accommodate vitamins and trace elements that are deemed relevant for meeting the patients’ needs in one terminally heat-sterilized product. For example, incompatibilities may occur when mixing vitamin and trace elements in the same preparation, and/or certain vitamins cannot withstand the terminal heat-sterilization of the product, which is, however, a preferable way of excluding bacterial contamination. The current ways to tackle these issues encompass the aforementioned addition of vitamins and/or trace elements to such PN products before administration, or by aseptic filtration of formulations comprising vitamins and trace elements in order to avoid the impact of heat during terminal heat-sterilization. However, the aseptic filtration of nutrition products is a complex process in case of MCBs and generally means that lipids are not included in such products as the aseptic filtration of lipids or lipid emulsions is difficult. Even if a set of stable formulations has been identified which can overcome the above-mentioned challenges, suitable multi-chamber containers are required that can safely and stably accommodate several formulations, such as five or more, that may have different requirements as to certain gas levels or that may have different volumes and thus may have different requirements as to the chambers’ peelable seals with regard to stability and breakability. At the same time, such MCBs must provide for their easy reconstitution before administration.

It is a challenge to provide a MCB with at least five or more chambers for accommodating said complete set of macronutrients and micronutrients for an AIO product, wherein the volume of one, two or more of the chambers will generally be significantly lower than that of the remaining chambers and which still fulfills all requirements of a MCB.

Figure 2:
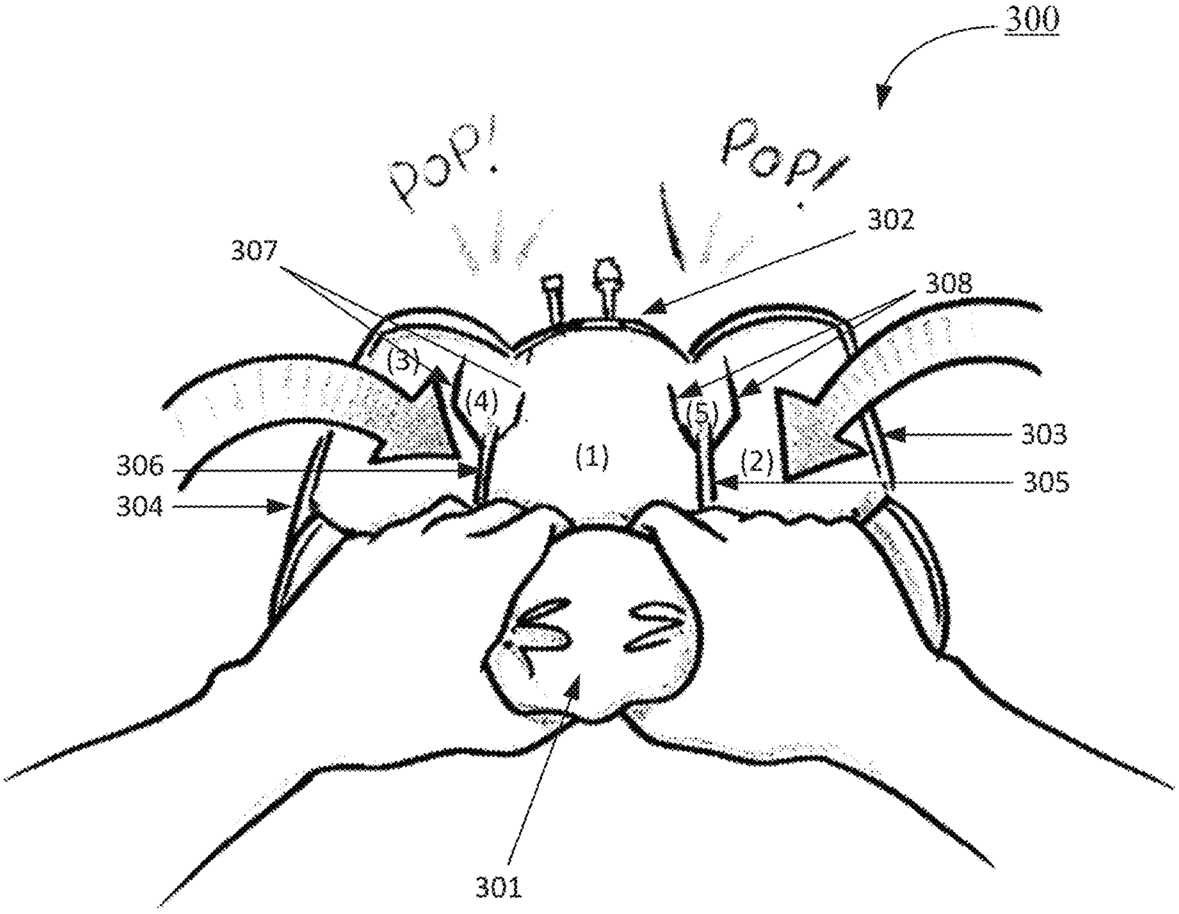
FIG. 2 is a schematic diagram showing that the proposed design of the MCB allows the opening of the five chambers simultaneously, in a mistake-proof way, meaning that the MCB prevents by design the occurrence of incomplete activation of the MCB (for example a partial activation where only 3 or 4 chambers would open at the same time) that would lead to an incomplete therapy. The MCB (e.g., the five-chamber container) proposed with the two smaller chambers at the bottom would lead to a single-step activation.

Specifically, the peelable sealing walls must be both stable enough so the walls do not break or start to leak during handling, including filling, sterilization, transport, and storage, and still allow an easy and smooth single-step activation or reconstitution of the bag without the additional risk of incomplete activation (FIG. 2). This is specifically challenging due to the combination of chambers having different volumes as the pressure exerted on the peelable seals by the large volume chambers, generally containing the macronutrients, is higher than that of the small volume chambers, generally containing the micronutrients.

It is also a challenge to design such MCB in a way that an undesired early mixing between two formulations that could lead to stability issues is avoided. For example, high concentrated glucose or acidic trace element formulations should not be mixed first with the lipid emulsion formulation and/or the vitamin formulation during reconstitution for stability reasons. They should be admixed preferably in one step together with the buffered amino acid solution.

Accordingly, a very careful design of a MCB according to the invention is required to address the above challenges.

The present invention addresses the issue by a careful design of a multi-chamber bag (MCB) having peelably sealing walls within the MCB that allows to include, into one MCB, a plurality of formulations for parenteral nutrition, including trace elements and vitamins that so far could not be stabilized in such ready-to-use PN products. The MCB are designed in a way that they can stably accommodate such macro- and micronutrient solutions that may have significantly different volumes together, in one flexible MCB, over a prolonged time, and which can be reconstituted following activating the multi-chamber container by rupturing or removing the peelably sealing walls for immediate administration without further manipulation and handling and without loss of the included sensitive vitamins and trace elements.

Unless defined otherwise, all technical and scientific terms used herein have the same meaning as commonly understood by one of ordinary skill in the art to which this invention belongs. As used herein the following terms have the following meanings.

The expression "comprising" or "comprises," as used herein, is intended to mean that the compositions and methods include the recited elements, but not excluding others.

The expression "about," when used before a numerical designation, e.g., temperature, time, amount, and concentration, including range, indicates approximations which may vary by (+) or (−) 10%, 5% or 1%.

The expression "formulation(s)" as used herein is interchangeably used with the expression "solution(s)". It refers to a liquid composition that can be used for intravenous administration to a patient for parenteral nutrition.

As used herein, the expression "nutrient" refers to a substance used by an organism, such as a human, to survive, grow, and reproduce. Some nutrients can be metabolically converted to smaller molecules in the process of releasing energy, such as carbohydrates and lipids. All organisms require water. Essential nutrients for animals and humans are the energy sources, some of the amino acids that are combined to create proteins, a subset of fatty acids, vitamins, and certain minerals and trace elements.

A classification used primarily to describe nutrient needs of humans and animals divides nutrients into "macronutrients" and "micronutrients". Consumed in relatively large amounts, macronutrients are used primarily to generate energy or to incorporate them into tissues for growth and repair. Specifically, the expression "macronutrient" or "macronutrients" refers to nutrients comprising carbohydrates, amino acids, and lipids.

"Micronutrients" are essential elements required by humans in small quantities throughout life for a range of physiological functions to maintain health. In the context of the present invention, the expression "micronutrients" refers to vitamins and trace elements. In the context of the invention, trace elements may be provided, for example, as chloride or sodium salts, as gluconates or sulfates.

The expression "carbohydrates" generally refers to the group of compounds including sugars, starches, and cellulose. In the context of the present invention, the expression refers to carbohydrates that can be used in formulations for parenteral nutrition, specifically to glucose, fructose and xylitol. It especially refers to glucose (D-glucose or dextrose). The expression is interchangeably used with the expression "saccharide(s)".

The expression "amino acids" as used herein, refers to amino acids as well as to dipeptides and oligopeptides, and encompasses, for example, alanine (Ala), arginine (Arg), aspartic acid (Asp), glutamic acid (Glu), glutamine (Gln), glycine (Gly), histidine (His), leucine (Leu), isoleucine (Ile), lysine (Lys), methionine (Met), phenylalanine (Phe), proline (Pro), serine (Ser), threonine (Thr), tryptophan (Trp), tyrosine (Tyr), valine (Val), cysteine (Cys), ornithine (Orn), acetyl-tyrosine (Ac-Tyr), Acetyl-cysteine (Ac-Cys), taurine, asparagine (Asn), alanyl-glutamine (Ala-Gln), glycyl-glutamine (Gly-Gln), alanyl-tyrosine (Ala-Tyr) and glycyl-tyrosine (Gly-Tyr).

The expression "lipids" (or, as interchangeably used herein, the expression "fats") refers to sources of fatty acids (FA) that can be used for parenteral nutrition. Lipids consist of triglycerides (TGs), and phospholipids. TGs constitute molecules of glycerol to which three fatty acids (FAs) have been esterified. FAs are an important component of lipid emulsions that can be used for providing lipids to a patient intravenously. FAs are classified based on several characteristics including the carbon chain length, degree of unsaturation, and location of the first double bond. Short chain FAs (SCFAs) have 2-4 carbons, medium chain FAs (MCFAs) have 6-12 carbons, while long chain FAs (LCFAs) have more than or equal to 14 carbons. Saturated FAs have no double bonds, monounsaturated FAs (MUFAs) have one double bond, and polyunsaturated FAs (PUFAs) have two or more double bonds. Saturated lipids can be sub-classified into short chain, medium chain, and long chain lipids whereas mono- and polyunsaturated lipids are all long chain lipids.

The expression "home parenteral nutrition" as used herein means nutrition support of patients who cannot meet their nutritional requirement by oral or enteral intake, and who are able to receive therapy outside the hospital setting. HPN is the primary life-saving therapy for patients with, for example, chronic intestinal failure (CIF). HPN may also be provided as palliative nutrition to patients in late phases of end-stage diseases, including cancer (Pironi et al.: ESPEN guideline on home parenteral nutrition. Clinical Nutrition (2020), 39:1645-1666).

The expression "total parenteral nutrition (TPN)" refers to parenteral nutrition that provides all daily nutritional requirements intravenously to patients who cannot otherwise ingest and/or digest nutrition. TPN can be a short-term or long-term nutritional therapy. "Partial parenteral nutrition (PPN)" refers to parenteral nutrition to patients whose nutritional requirements cannot be fully met via the enteral or oral route. TPN and PPN can be provided to hospitalized patients, including patients in intensive care, but also to home parenteral patients, to avoid malnutrition.

The expression "terminally sterilized" means that such products must have a probability of nonsterile unit (PNSU) or a sterility assurance level (SAL) of not more than one in a million units produced, in accordance with the guidelines in Europe and the United States. SAL has been defined by European Pharmacopoeia in such a way that its numerical value is the same of PNSU. Accordingly, a SAL or PNSU of $10^{-6}$ indicates that the probability of an organism surviving to the end of the sterilization process in any single unit of product is less than one in one million. The proof that a terminally sterilized product complies with the $10^{-6}$ SAL/PNSU can be accomplished by several different sterilization cycle development approaches. The proper application of this method requires extensive scientific knowledge regarding the sterilization method selected for use with a specific product. Further background information is provided, for example, in von Woedtke and Kramer, GMS KHI (2008), 3(3), 1-10 (ISSN 1863-5245). The expression "sterility" or "sterile" means the absence of all viable microorganisms including viruses. The expression "terminal heat-sterilization" means that terminal sterilization is achieved by subjecting the product to be sterilized to heat.

As used herein, the expression "reconstituted solution" as used herein refers to a solution for parenteral administration which is generated by admixing the content of the chambers of a multi-chamber container before use. Generally, all chambers or compartments are admixed for reconstituting a multi-chamber bag. However, it is also possible to provide MCBs that support the selective activation of the peelable seals to permit the admixing of less than all of the separately stored components. The resulting solution, e.g. in case at least one of the compartments of the MCB is not activated, such as, for example, the chamber comprising the lipid emulsion, would still be considered a "reconstituted solution" according to the invention.

As used herein, the expression "multi-chamber bag (MCB)" which is interchangeably used herein with the expression "multi-chamber container", refers to containers or bags made from a flexible film material and which are compartmentalized into two or more chambers. They allow for the safe and stable accommodation of medical solutions that must be kept separate until the formulations can be mixed (reconstituted) shortly before their administration to a patient to avoid inevitable reactions between the formulations. Therefore, MCBs have peelable seals or welds (e.g., removable thermo-welds) between the chambers to be reconstituted. The weld or seals can be opened, for example, by squeezing.

As used herein, the expression "peelable" or "peelably" refers to the property of sealing walls within the MCBs of the present invention being removable by an external force such as thermal or physical force. Unlike permanently welding or sealing walls, peelably sealing walls can be ruptured by applying pressure on the container chambers (e.g., rolling the container or pressing on one of the chambers). However, strength of the peelably sealing walls of the present invention should be high enough for production and transport and still low enough to easily open the chambers.

In one embodiment, rolling the flexible multi-chamber bag from the top edge would be enough to allow the completely opening of the peelably sealing walls and completely mixing the five chamber contents, thus activating the ready-to-use, all-in-one parenteral nutrition product.

As used herein, the expression "non-peelable" or "non-peelably" refers to the property of sealing walls at the top edge, at the bottom edge, at the left edge and at the right edge of the flexible multi-chamber bag being permanently sealed and welded, which cannot be ruptured or remove during the activation and use of the ready-to-use, all-in-one parenteral nutrition product.

The expression "peelable seals," "peelably heat-sealed welds," or "peelably sealing walls" is used interchangeably, referring to sealing walls within the MCBs of the present invention. The peelably sealing walls of the present invention can be ruptured or removed by applying pressure/force on the MCBs (e.g., rolling the MCBs or pressing on one of the chambers of the MCBs). However, strength of the peelably sealing walls of the present invention should be high enough for production and transport and still low enough to easily be ruptured or removed during activation.

The expression "adult(s)" or "adult patient(s)" as used herein refers to persons of 19 years of age and older. The expression "pediatric" as used herein refers to neonates, including premature (pre-term), full term, and post-mature neonates of up to (and including) 5 months of age; infants of between six month and of up to (and including) 24 months of age; children of between 2 years and of up to (and including) 12 years of age, and adolescents of between 13 and up to (and including) 18 years of age.

The expression "stable" or "stably" as used herein in connection with components contained in the terminally heat-sterilized MCB of the invention (e.g., lipid emulsions, carbohydrate formulations, amino acid formulations, vitamin or trace element formulations) means that at least 50%, at least 60%, at least 70% or at least 80% of the amount of such component initially provided in the product is still available after terminal heat-sterilization and storage of the terminally heat-sterilized multi-chamber bag of the invention for at least 6 months, preferably for at least 12 months, and more preferably for at least 18 months and even more preferably for at least 24 months at a temperature of from 1° C. to 40° C., such as at temperatures of from 1° C. to 25° C. The expression "stable" or "stably" as used herein in connection with the multi-chamber bag and its peelable and non-peelable seals means that the non-peelable and peelable seals of the MCB do not rupture or cause any leakage throughout the production, filling, sterilization, transport and storage of the container, and that the peelable seals will open only upon applying targeted pressure on the bag for reconstituting the contained formulations. Accordingly, no premature mixing or leakage between one or more chambers must occur before such reconstitution.

The term "dissolved oxygen" (DO) refers to the level of free, non-compound oxygen present in water or other liquids or solutions, such as solutions for parenteral nutrition. Oxygen saturation (symbol SO2) is a relative measure of the concentration of oxygen that is dissolved or contained in a given medium as a proportion of the maximal concentration that can be dissolved in that medium. It can be measured with a dissolved oxygen probe such as an oxygen sensor or an optode in liquid media, usually water.

The present disclosure provides for a multi-chamber bag which addresses the problems of accommodating a plurality of solutions of potentially different volumes in one container, including sensitive formulations such as vitamins and trace elements that have to be provided together with all macronutrients, i.e. lipids, carbohydrates and amino acids, in one multi-chamber bag. The problem is addresses by providing for at least four, preferably at least five chambers or at least six chambers. For example, a five chamber bag may accommodate a carbohydrate formulation in a first chamber, an amino acid formulation in a second chamber, a lipid formulation in a third chamber, a trace element formulation in a fourth chamber and a vitamin formulation in a fifth chamber.

In one aspect, the present invention relates to a flexible multi-chamber bag for storing and reconstituting parenteral nutrition solutions. Specifically, the flexible multi-chamber bag comprises at least five chambers separated by peelably sealing walls between the at least five chambers. Once activated (e.g., by thermal or, preferably, by physical force), the peelably sealing walls can be removed or ruptured and the contents from the at least five chambers can be mixed to form a single solution in one chamber.

In one preferred embodiment, the flexible multi-chamber bag comprises at least a first chamber, a second chamber, a third chamber, a fourth chamber and a fifth chamber. Preferably, the flexible multi-chamber bag comprises at least five chambers which accommodate a carbohydrate formulation in a first chamber, an amino acid formulation in a second chamber, a lipid formulation in a third chamber, a trace element formulation in a fourth chamber and a vitamin formulation in a fifth chamber.

In one embodiment, the flexible MCBs of the present invention are made by circumferentially welding two polymer films (e.g., foils) at the edges with non-peelably sealing walls and furthermore containing peelably sealing walls within the MCBs to separate one single bag into at least five chambers.

In one embodiment, the flexible multi-chamber bag comprises peelably sealing walls separating the multi-chambers for storing and reconstituting parenteral nutrition solutions once the peelably sealing walls are ruptured or removed.

The flexible multi-chamber bag comprises: two polymer films edge-sealed to form a first bag having a top edge, a bottom edge, a left edge and a right edge, wherein the top edge, the bottom edge, the left edge and the right edge are non-peelably sealed; a first plurality of tubes with sidewalls non-peelably sealed between the two polymer films at the top edge to form a first plurality of port tubes; a second plurality of tubes with sidewalls non-peelably sealed between the two polymer films at the bottom edge to form a second plurality of port tubes; a first peelably sealing wall and a second peelably sealing wall between the two polymer films extending from the top edge to the bottom edge and separating the first bag into a first chamber between the first peelably sealing wall and the second peelably sealing wall, a first space between the left edge and the first peelably sealing wall, a second space between the second peelably sealing wall and the right edge; a third peelably sealing wall extending from the left edge to the first peelably sealing wall to separate the first space to form a third chamber and a fourth chamber; and a fourth peelably sealing wall extending from the right edge to the second peelably sealing wall to separate the second space to form a second chamber and a fifth chamber.

In one embodiment, the third peelably sealing wall comprises a fifth peelably sealing wall starting from an inner surface of the left edge and a sixth peelably sealing wall starting from the first peelably sealing wall, and both the fifth peelably sealing wall and the sixth peelably sealing wall connect at a first connection point to form the third peelably sealing wall.

In one embodiment, the left edge and the fifth peelably sealing wall have an angle greater than 90° toward the top edge direction, and the fifth peelably sealing wall and the sixth peelably sealing wall around the first connection point have an angle in the range between 130° and 170°.

In one embodiment, the left edge and the fifth peelably sealing wall have the angle of about 100° toward the top edge direction, and the fifth peelably sealing wall and the sixth peelably sealing wall around the first connection point have an angle in the range between 150° and 160°.

In one embodiment, the left edge and the fifth peelably sealing wall have the angle of 102° toward the top edge direction, and the fifth peelably sealing wall and the sixth peelably sealing wall around the first connection point have an angle of 156°.

In one embodiment, a seventh peelably sealing wall starts from the first connection point and extends to the bottom edge to separate the fourth chamber to form a sixth chamber between the seventh peelably sealing wall and the first peelably sealing wall.

In one embodiment, the fourth peelably sealing wall comprises an eighth peelably sealing wall starting from an inner surface of the right edge and a ninth peelably sealing wall starting from the second peelably sealing wall, and both the eighth peelably sealing wall and the ninth peelably sealing wall connect at a second connection point to form the fourth peelably sealing wall.

In one embodiment, the right edge and the eighth peelably sealing wall have an angle greater than 90° toward the top edge direction, and the eighth peelably sealing wall and the ninth peelably sealing wall around the second connection point have an angle in the range between 130° and 170°.

In one embodiment, the right edge and the eighth peelably sealing wall have the angle of about 100° toward the top edge direction, and the eighth peelably sealing wall and the ninth peelably sealing wall around the second connection point have an angle in the range between 150° and 160°.

In one embodiment, the right edge and the eighth peelably sealing wall have the angle of 102° toward the top edge direction, and the eighth peelably sealing wall and the ninth peelably sealing wall around the second connection point have an angle of 156°.

In one embodiment, at least one of the first chamber, the second chamber and the third chamber connects to the first plurality of port tubes.

In one embodiment, each of the first chamber, the second chamber and the third chamber connects to the first plurality of port tubes.

In one embodiment, at least one of the fourth chamber and the fifth chamber connects to the second plurality of port tubes.

In one embodiment, each of the fourth chamber and the fifth chamber connects to the second plurality of port tubes.

In one embodiment, the first chamber connects to an administration port and/or a medication port at the bottom edge.

In one embodiment, the first chamber connects to both an administration port and a medication port at the bottom edge.

In one embodiment, the flexible multi-chamber bag comprises a first portion near the top edge comprising the first plurality of port tubes, and the first portion is peelably sealed and removed from the flexible multi-chamber bag.

In one embodiment, the flexible multi-chamber bag comprises a second portion at the left corner of the flexible multi-chamber bag, the second portion comprises the port tube to the fourth chamber, and the second portion is peelably sealed and removed from the flexible multi-chamber bag.

In one embodiment, the flexible multi-chamber bag comprises a third portion at the right corner of the flexible multi-chamber bag, the third portion comprises the port tube to the fifth chamber, and the third portion is peelably sealed and removed from the flexible multi-chamber bag.

Figure 1B:
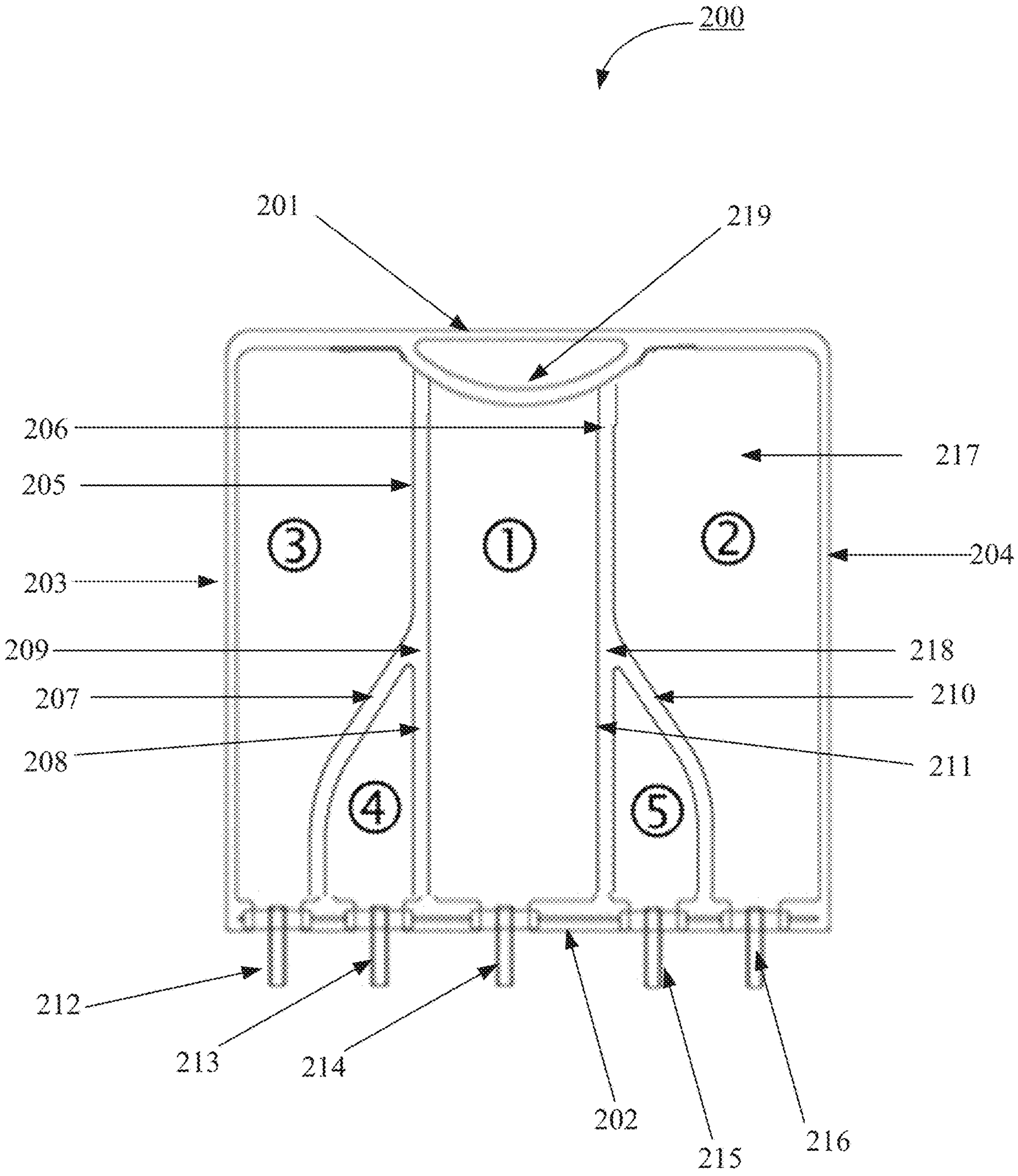
Figure 1C:
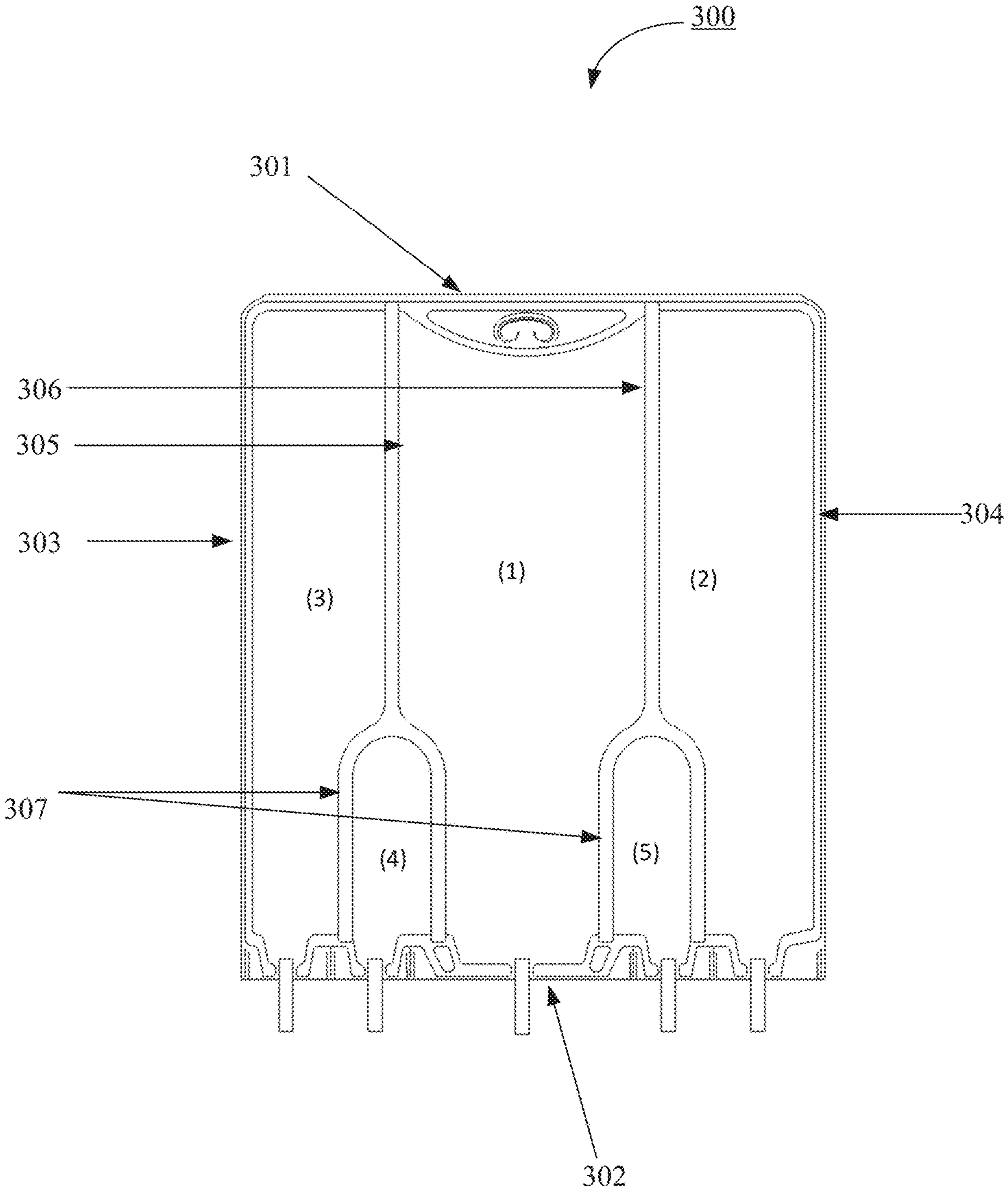

Referring now to FIG. 1 (FIG. 1*a* and FIG. 1*b*), example designs of the multi-chamber bags (MCBs) according to the invention are shown and the MCBs comprise five chambers which contain a carbohydrate formulation in the first chamber (1), an amino acid formulation in the second chamber (2), a lipid formulation in a third chamber (3), a trace element formulation in a fourth chamber (4) and a vitamin formulation in a fifth chamber (5).

As shown in FIG. 1*a*, the flexible multi-chamber bag 100 comprises two polymer films edge-sealed or welded to form a first bag having a front surface 117 and a back surface (not shown), a top edge 101, a bottom edge 102, a left edge 103 and a right edge 104. In one embodiment, the top edge 101, the bottom edge 102, the left edge 103 and the right edge 104 are permanently sealed or welded. In one preferred embodiment, the top edge 101, the bottom edge 102, the left edge 103 and the right edge 104 are non-peelably sealed or welded. Specifically, the top edge 101, the bottom edge 102, the left edge 103 and the right edge 104 cannot be ruptured or open during the use of the flexible multi-chamber bag 100, especially during activation of the flexible multi-chamber bag 100.

The flexible multi-chamber bag 100 comprises a handle 119 having both ends connected to the top edge 101 on the front surface 111. One can use the handle 119 to handle the flexible multi-chamber bag 100 in a medical setting (e.g., hanging the flexible multi-chamber bag 100 to an administration pole).

The flexible multi-chamber bag 100 comprises two first peelably sealing walls 105 and 106 between the two polymer films extending from the top edge 101 to the bottom edge 102 and separating the first bag into a first chamber (1), a second chamber (2) and a third chamber (3), wherein the first chamber (1) is between the second chamber (2) and the third chamber (3). In one embodiment, at least one of the two first peelably sealing walls 105 and 106 is split into a second plurality of second peelably sealing walls and the second plurality of the second sealing walls are non-peelably sealed to the bottom edge 102 to form additional chambers.

In one embodiment, both the two first peelably sealing walls 105 and 106 are split into a second plurality of second peelably sealing walls and the second plurality of the second sealing walls are non-peelably sealed to the bottom edge 102 to form additional chambers. In one embodiment, both the two first peelably sealing walls 105 and 106 are split into at least two second peelably sealing walls and the least two second sealing walls are non-peelably sealed to the bottom edge 102 to form at least two additional chambers.

For example, as shown in FIG. 1*a*, both the two first peelably sealing walls 105 and 106 are split at the splitting points 109 and 118 into at least two second peelably sealing walls 107 and 108, 110 and 111, the least two second sealing walls 107 and 108, 110 and 111 are non-peelably sealed to the bottom edge 102 to form two additional chambers (i.e., the fourth chamber (4) and the fifth chamber (5)).

In one embodiment, the two first peelably sealing walls 105 and 106 are split at a location between the top edge 101 and the bottom edge 102, and the fourth chamber (4) and the fifth chamber (5) are relatively smaller than the first chamber (1), the second chamber (2), or the third chamber (3).

In one embodiment, each of the first chamber (1), the second chamber (2), the third chamber (3), the fourth chamber (4) and the fifth chamber (5) comprises any of an amino acids solution optionally containing some vitamins or trace elements; a glucose solution optionally containing some vitamins or trace elements; a lipid emulsion optionally containing fat-soluble vitamins; a vitamins solution or emulsion; or a trace elements solution.

In one embodiment, the chamber containing a glucose solution is not in a direct contact with the chamber containing a vitamins solution or emulsion. In one embodiment, smaller chambers contain a vitamins solution or emulsion or a trace elements solution.

For example, when either the third chamber (3) or the second chamber (2) contains a glucose solution, either the fifth chamber (5) or the fourth chamber (4) contains a vitamins solution or emulsion.

In one embodiment, the first chamber (1) contains an amino acids solution optionally containing some vitamins or trace elements. The amino acids solution optionally contains some vitamins or trace elements. In one embodiment, the second chamber (2) contains a glucose solution optionally containing some vitamins or trace elements. The glucose solution optionally contains some vitamins or trace elements. In one embodiment, the third chamber (3) contains a lipid emulsion optionally containing fat-soluble vitamins. The lipid emulsion optionally contains fat-soluble vitamins. In one embodiment, the fourth chamber (4) contains a vitamins solution or emulsion. In one embodiment, the fifth chamber (5) contains a trace elements solution.

In one preferred embodiment, the first chamber (1) contains an amino acids solution, which optionally contains some vitamins or trace elements; the second chamber (2) contains a glucose solution, which optionally contains some vitamins or trace elements; the third chamber (3) contains a lipid emulsion, which optionally contains fat-soluble vitamins; the fourth chamber (4) contains a vitamins solution or emulsion; and the fifth chamber (5) contains a trace elements solution.

The present MCB (e.g., five-chamber bag) can be developed in different sizes to accommodate diverse storage volumes. Table 1 below shows an example of possible volumes.

TABLE 1

Possible volumes for the chambers.

| | The first chamber (1) | The second chamber (2) | The third chamber (3) | The fourth chamber (4) | The fifth chamber (5) |
|---|---|---|---|---|---|
| Format 1 1050 mL | 533 mL | 267 mL | 200 mL | 25 mL | 25 mL |
| Format 2 1550 mL | 800 mL | 400 mL | 300 mL | 25 mL | 25 mL |
| Format 3 2050 mL | 1067 mL | 533 mL | 400 mL | 25 mL | 25 mL |

In one preferred embodiment, the shape and the size of the two small chambers (the fourth chamber (4) and the fifth chamber (5)) are not varying across the different possible five-chamber bag formats. While the large chambers can vary to accommodate different macronutrient doses, the two small chambers will store fixed volumes of trace elements and vitamins solutions, respectively. The concentration of the various trace elements and vitamins may, however, vary.

As shown in FIG. 1*a*, the flexible multi-chamber bag 100 comprises a plurality of tubes with sidewalls non-peelably sealed between the two polymer films at the bottom edge 102 to form a first plurality of port tubes 112-116. In one embodiment, the contents of the chambers were added through the corresponding port tubes 112-116.

In one embodiment, each of the first chamber (1), the second chamber (2), the third chamber (3), the fourth chamber (4) and the fifth chamber (5) is connected to at least one port tube. In one embodiment, only some of the first chamber (1), the second chamber (2), the third chamber (3), the fourth chamber (4) and the fifth chamber (5) are connected to one or more port tubes. In one embodiment, only one of the first chamber (1), the second chamber (2), the third chamber (3), the fourth chamber (4) and the fifth chamber (5) is connected to one or more port tubes. In another embodiment, only the first chamber (1) is connected with one or more port tubes.

FIG. 1*a* shows an example of the present MCB in which each of the first chamber (1), the second chamber (2), the third chamber (3), the fourth chamber (4) and the fifth chamber (5) is connected with one port tube. For example, the first chamber (1) is connected to the port tube 114; the second chamber (2) is connected to the port tube 116; the third chamber (3) is connected to the port tube 112; the fourth chamber (4) is connected to the port tube 113; and the fifth chamber (5) is connected to the port tube 115.

In one embodiment, FIG. 1*a* also represents an example of the MCB according to certain embodiments of the present invention, in which each of the second chamber (2), the third chamber (3), the fourth chamber (4) and the fifth chamber (5) was initially connected to one or more port tubes. Parts of the MCBs comprising one or more port tubes for the second chamber (2), the third chamber (3), the fourth chamber (4) and the fifth chamber (5) were later sealed and removed from the rest of the MCB to form a funnel shape near the bottom edge 102.

In one embodiment, vitamins are one of the components to be stored in the MCB. Some vitamins are known to be extremely sensitive to oxygen. An oxygen barrier film is therefore required to provide adequate protection to the oxygen-sensitive solution and guarantee stability along with the shelf life as well as during the infusion of the product.

Thus, in one embodiment, the polymer films for making the MCB are as barrier films that block oxygen migration outside of the chamber made of a multilayer structure including a barrier layer(s). For example, barrier films may comprise:

- a metalized film layer such as a polyethylene terephthalate PET coated with an inorganic deposit of silicon oxide or aluminum oxide that is laminated to the rest of the film structure;
- a halogenated polyvinylidene layer such as PVDC;
- amorphous nylon or crystalline nylon or combination of both nylons layer;
- a copolymer of ethylene layer such as ethylene-vinyl alcohol copolymer layer (EVOH); and
- a combination of several of the above layer.

FIG. 1*b* shows another example MCB according to certain embodiments of the present invention. As shown in FIG. 1*b*, a flexible multi-chamber bag 200 comprises two polymer films edge-sealed or welded to form a first bag having a front surface 217 and a back surface (not shown), a top edge 201, a bottom edge 202, a left edge 203 and a right edge 204. In one embodiment, the top edge 201, the bottom edge 202, the left edge 203 and the right edge 204 are permanently sealed or welded. In one preferred embodiment, the top edge 201, the bottom edge 202, the left edge 203 and the right edge 204 are non-peelably sealed or welded. Specifically, the top edge 201, the bottom edge 202, the left edge 203 and the right edge 204 cannot be ruptured or open during the use of the flexible multi-chamber bag 200, especially during activation of the flexible multi-chamber bag 200.

The flexible multi-chamber bag 200 comprises a handle 219 having both ends connected to the top edge 201 on the front surface 217 to allow a user to handle the flexible multi-chamber bag 200 in a medical setting (e.g., hanging the flexible multi-chamber bag 200 to an administration pole).

The flexible multi-chamber bag 200 comprises two first peelably sealing walls 205 and 206 between the two polymer films extending from the top edge 201 to the bottom edge 202 and separating the first bag into a first chamber (1), a second chamber (2) and a third chamber (3), wherein the first chamber (1) is between the second chamber (2) and the third chamber (3). In one embodiment, at least one of the two first peelably sealing walls 205 and 206 is split into a second plurality of second peelably sealing walls and the second plurality of the second sealing walls are non-peelably sealed to the bottom edge 202 to form additional chambers.

In one embodiment, both the two first peelably sealing walls 205 and 206 are split into a second plurality of second peelably sealing walls and the second plurality of the second sealing walls are non-peelably sealed to the bottom edge 202 to form additional chambers. In one embodiment, both the two first peelably sealing walls 205 and 206 are split into at least two second peelably sealing walls and the least two second sealing walls are non-peelably sealed to the bottom edge 202 to form at least two additional chambers.

For example, as shown in FIG. 1*b*, both the two first peelably sealing walls 205 and 206 are split at the splitting points 209 and 218 into at least two second peelably sealing walls 117 and 118, 210 and 211 and the least two second sealing walls 117 and 118, 210 and 211 are non-peelably sealed to the bottom edge 202 to form two additional chambers (i.e., the fourth chamber (4) and the fifth chamber (5)).

In one embodiment, the two first peelably sealing walls 205 and 206 are split at a location between the top edge 201 and the bottom edge 202. Thus, the fourth chamber (4) and the fifth chamber (5) are relatively smaller than the first chamber (1), the second chamber (2), or the third chamber (3).

As discussed in this disclosure, each of the first chamber (1), the second chamber (2), the third chamber (3), the fourth chamber (4) and the fifth chamber (5) comprises any of an amino acids solution optionally containing some vitamins or trace elements; a glucose solution optionally containing some vitamins or trace elements; a lipid emulsion optionally containing fat-soluble vitamins; a vitamins solution or emulsion; or a trace elements solution. In one preferred embodiment, the first chamber (1) contains an amino acids solution, which optionally contains some vitamins or trace elements; the second chamber (2) contains a glucose solution, which optionally contains some vitamins or trace elements; the third chamber (3) contains a lipid emulsion, which optionally contains fat-soluble vitamins; the fourth chamber (4) contains a vitamins solution or emulsion; and the fifth chamber (5) contains a trace elements solution.

As shown in FIG. 1*b*, the flexible multi-chamber bag 200 comprises a plurality of tubes with sidewalls non-peelably sealed between the two polymer films at the bottom edge 202 to form a first plurality of port tubes 212-216. In one embodiment, the contents of the chambers were added through the corresponding port tubes 212-216.

In one embodiment, each of the first chamber (1), the second chamber (2), the third chamber (3), the fourth chamber (4) and the fifth chamber (5) is connected to at least one port tube. In one embodiment, only some of the first chamber (1), the second chamber (2), the third chamber (3), the fourth chamber (4) and the fifth chamber (5) are connected to one or more port tubes. In one embodiment, only one of the first chamber (1), the second chamber (2), the third chamber (3), the fourth chamber (4) and the fifth chamber (5) is connected to one or more port tubes. In another embodiment, only the first chamber (1) is connected with one or more port tubes.

In one preferred embodiment, only two chambers (e.g., the first chamber (1) and the second chamber (2)) each comprise one port tube. More preferably, the first chamber (1) comprises an administration port and the second chamber (2) comprises a medication port. In another preferred embodiment, only chamber (1) comprises both an administration and a medication port.

FIG. 1*b* shows an example of the present MCB in which each of the first chamber (1), the second chamber (2), the third chamber (3), the fourth chamber (4) and the fifth chamber (5) is connected to at least one port tube. Specifically, the first chamber (1) is connected to the port tube 214; the second chamber (2) is connected to the port tube 216; the third chamber (3) is connected to the port tube 212; the fourth chamber (4) is connected to the port tube 213; and the fifth chamber (5) is connected to the port tube 215.

In one embodiment, some of the port tubes (e.g., one or more of the port tubes 212, 213, 215 and 216) may be removed. For example, parts of the MCBs comprising one or more port tubes (e.g., the port tubes 212, 213, 215 and 216) for the second chamber (2), the third chamber (3), the fourth chamber (4) and the fifth chamber (5) may be sealed and removed from the rest of the MCB to form a funnel shape near the bottom edge 202.

In one embodiment, at least one of the fourth chamber (4) and the fifth chamber (5) is symmetrical. In one embodiment, both the fourth chamber (4) and the fifth chamber (5) are symmetrical. In one embodiment, at least one of the fourth chamber (4) and the fifth chamber (5) is unsymmetrical. In one embodiment, both the fourth chamber (4) and the fifth chamber (5) are unsymmetrical. In one embodiment, one of the fourth chamber (4) and the fifth chamber (5) is symmetrical and the other is unsymmetrical.

FIG. 2 demonstrates the single step activation of one exemplary MCB 300 according to some embodiments of the present invention.

As shown in FIG. 2, the MCB 300 of the present invention comprising peelably sealing walls (306, 307, 305 and 308) separating the MCB 300 into the first chamber (1), the second chamber (2), the third chamber (3), the fourth chamber (4) and the fifth chamber requires one single step activation.

In one embodiment, the present MCBs may be activated by physical force or heat. Preferably, the present MCBs may be activated by physical force.

In one embodiment, rolling the MCBs from the top edge would be sufficient to completely open the peelably sealing walls to thus mix the contents from all the chambers.

In one embodiment, the present MCB comprising peelably sealing walls allows the opening of the plurality of chambers simultaneously, in a mistake-proof way. Thus, the present MCBs can prevent by design the occurrence of incomplete activation of the MCBs (for example a partial activation where only 3 or 4 chambers of a 5CB would open at the same time) that would lead to an incomplete therapy.

For example, FIG. 2 shows that rolling the MCB 300 from the top edge 301 to the direction of the bottom edge 302 is sufficient to completely open the peelably sealing walls 306, 307, 305 and 308. Thus, the contents of the first chamber (1), the second chamber (2), the third chamber (3), the fourth chamber (4) and the fifth chamber (5) can be mixed by the single step activation into one single solution. The non-peelably sealings of the top edge 301, the bottom edge 302, the left edge 303 and the right edge prevent the mixed solution from leaking outside of the MCB 300.

In one embodiment, the second peelably sealing walls from the splitting of the first peelably sealing walls form a "V" shape for the fourth chamber (4) and/or the fifth chamber (5) toward the bottom edge of the MCB. One of the second peelably sealing wall is connected with a third peelably sealing wall and the other second peelably sealing wall is connected with a fourth peelably sealing wall. Both the third peelably sealing wall and the fourth peelably sealing wall are parallel with the left edge and/or the right edge.

In one embodiment, the two second peelably sealing walls around the splitting point have an angle between 20° and 50°, between 25° and 45°, between 27° and 42°, between 29° and 40°, between 30° and 39°, between 32° and 38°, between 34° and 37°, between 35° and 36.5°, or 36°.

In one embodiment, the first peelably sealing wall and the second peelably sealing wall around the splitting point have an angle between 130° and 180°, between 140° and 176°, between 150° and 171°, between 155° and 169°, between 158° and 167°, between 160° and 165°, between 161° and 163°, or 162°.

In another embodiment, one of the second peelably sealing walls and the fourth peelably sealing wall around their connecting point have an angle between 130° and 180°, between 140° and 176°, between 150° and 171°, between 155° and 169°, between 158° and 167°, between 160° and 165°, between 161° and 163°, or 162°.

Figure 3A:
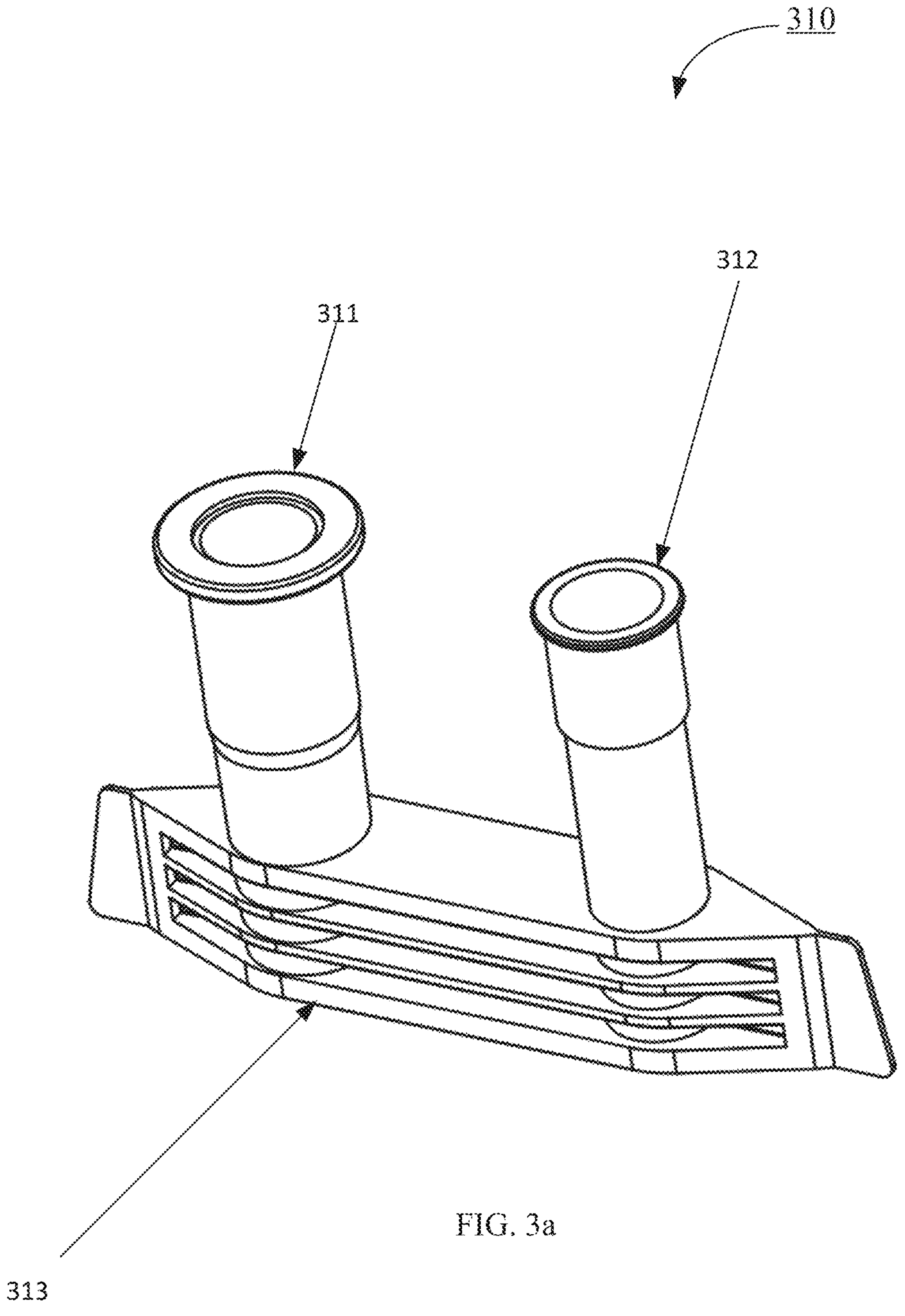
FIG. 3 (including FIG. 3*a*, FIG. 3*b*, FIG. 3*c* and FIG. 3*d*) is a set of schematic diagrams showing exemplary designs of an access system 310-340 combining administration and medication ports. The access system may be used to connect the first chamber (1). In one embodiment, the sealing of this rigid closure instead of two tubes between the two plies of plastic film may result in a larger volume of air entrapped between the plies. The amino acid solution containing potentially some vitamins being prone to oxidize. Thus, it is important to limit the residual oxygen in the first chamber (1). If both accesses to the rigid closure are closed, the sealing of the rigid closure between the two plies of plastic film can be made under nitrogen limiting the quantity of oxygen entrapped between the plies. Another way shall then be envisaged to fill that compartment.

FIG. 3*a* is a schematic diagram showing an exemplary design of an access system 310 combining an administration port 311 and a medication/injection port 312. As shown in FIG. 3*a*, the access system 310 includes the administration port 311 and the medication/injection port 312, and a base 313 having two small wings.

In one embodiment, the access system 310 may be made from a rigid polymer or mix of rigid polymers formulated to allow sealing to the internal layer of the film. The base 313 ends with two small wings to guarantee the absence of channel leak in the sealing area.

In one embodiment, the access system 310 may be used to connect the first chamber (1). In one embodiment, the sealing of this rigid closure of the access system 310 instead of two tubes between the two plies of plastic film may result in a larger volume of air entrapped between the plies. The amino acid solution containing potentially some vitamins being prone to oxidize. Thus, it is important to limit the residual oxygen in the first chamber (1). If both accesses to the rigid closure are closed, the sealing of the rigid closure between the two plies of plastic film can be made under nitrogen limiting the quantity of oxygen entrapped between the plies.

Thus, the access system 310 combining administration 311 and medication ports 312, once connected to the first chamber (1), may limit the quantity of oxygen in the first chamber (1).

Figure 3B:
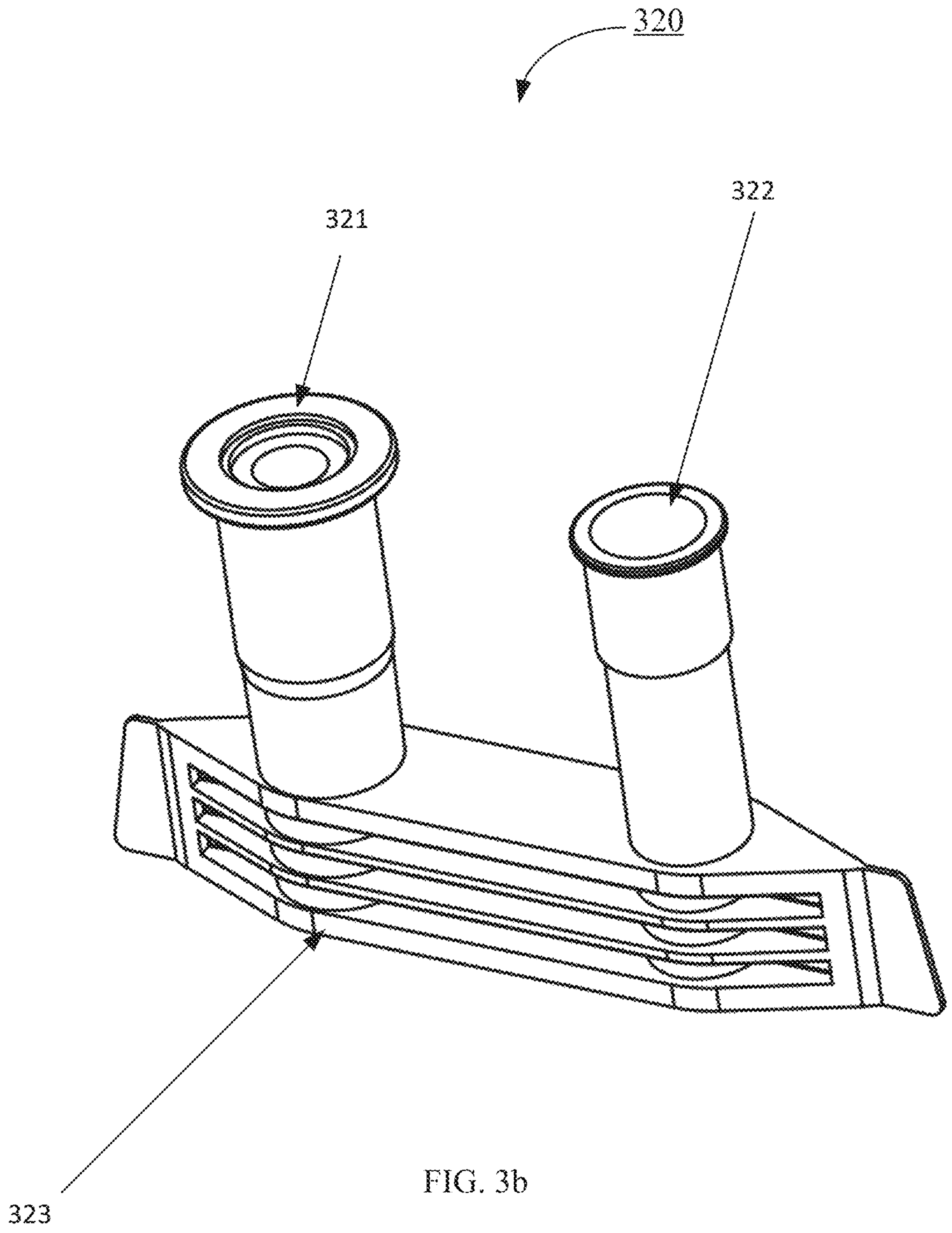

As shown in FIG. 3*b*, an access system 320 includes an administration port 321 and a medication/injection port 322, and a base 323 having two small wings.

Figure 3C:
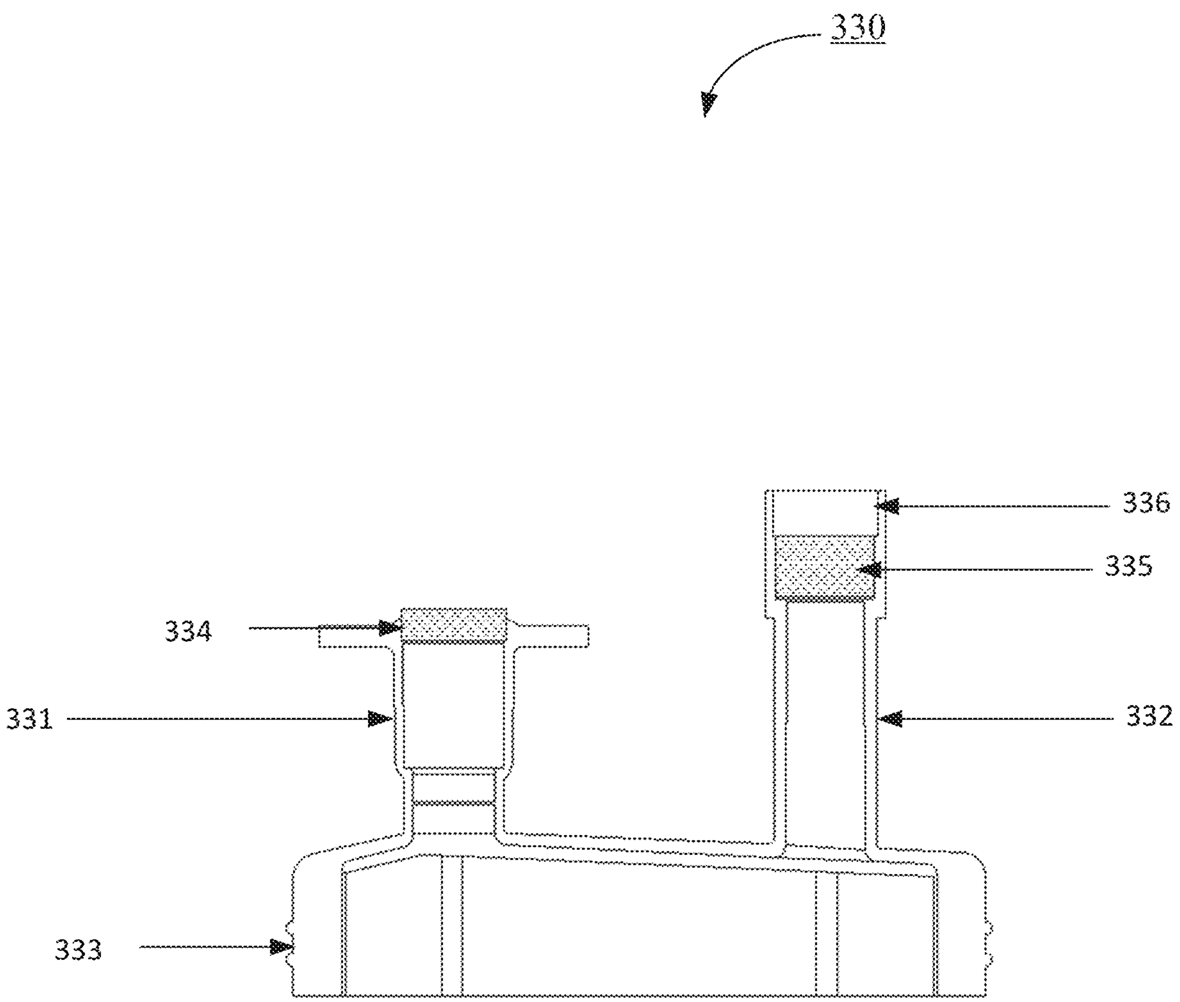

FIG. 3*c* is a schematic diagram showing a cross section of a design of an access system 330 according to some embodiments of the present invention. As shown in FIG. 3*c*, the access system 330 includes an administration port 331 and a medication/injection port 332, and a base 333 having two small wings. The medication/injection port 332 includes a septum 335 (made of a soft material such as rubber) near the top of the medication/injection port 332. This soft material allows pierced with metallic needle for drug admixture.

In one embodiment, the septum 335 near the top of the medication/injection may be covered with a sealed lid or may be designed to end with a protecting breakable cap to guarantee the cleanliness of the surfaces.

In one embodiment, the administration port 331 includes a second septum 334 (made of another soft material such as polyisoprene, silicone or another elastomer). This administration port is designed to allow insertion of a plastic cannula and the soft material prevents leakage during insertion and cannula detachment.

In one embodiment, the complete access system 320 can be produced by a 2 k (two materials) injection molding process and then the soft material may be typically chosen from the family of thermoplastic elastomer.

In one embodiment, both the administration port 331 and the medication/injection port 332 may be covered with a sealed lid or can be designed to end with a protecting breakable cap to guarantee the cleanliness of the surfaces.

Figure 3D:
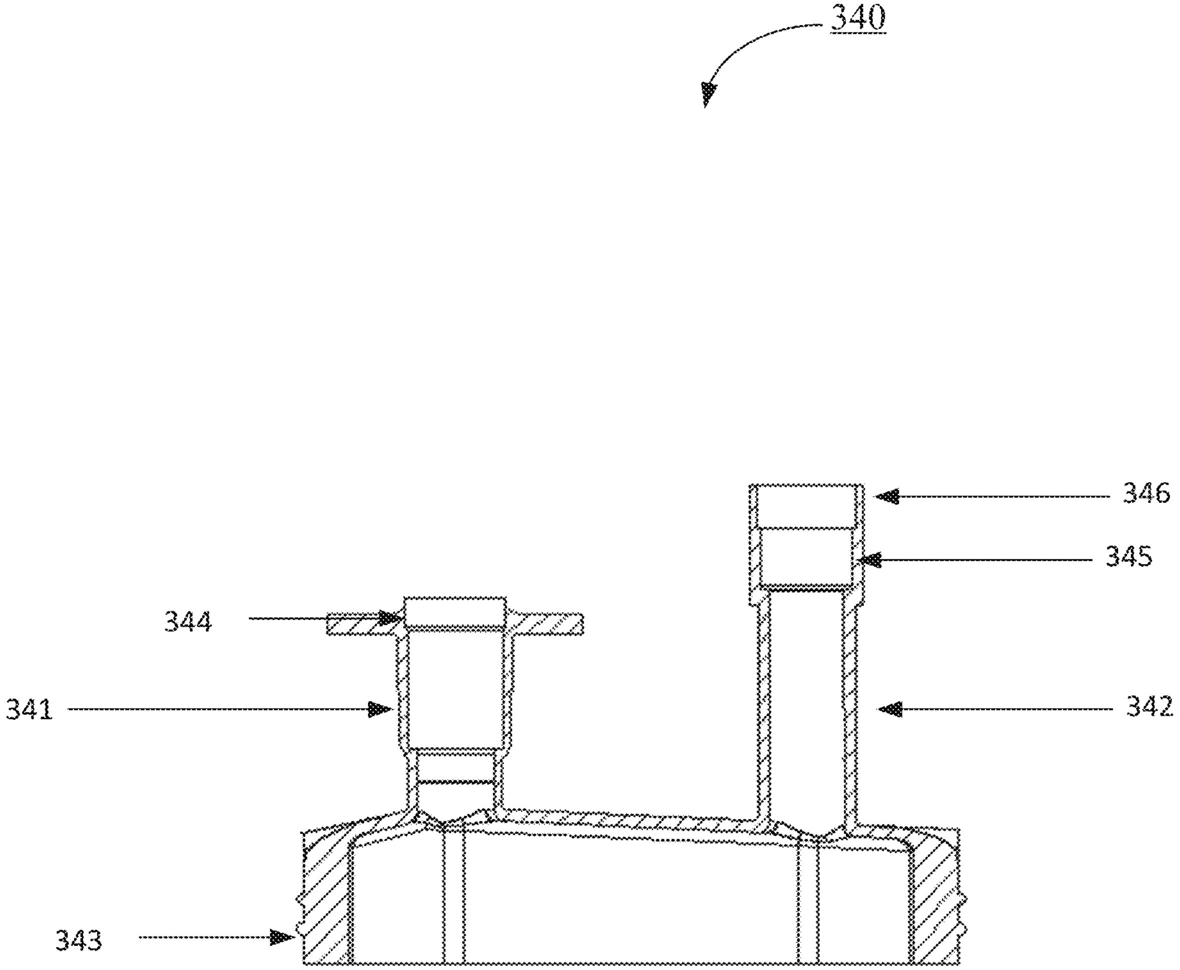

As shown in FIG. 3*d*, an access system 340 includes an administration port 341 and a medication/injection port 342, and a base 343 having two small wings. The medication/injection port 342 includes a housing 345 for holding a septum (not shown) near the top of the medication/injection port 342.

The administration port 341 includes a second housing for 334 for another septum. This administration port 341 is designed to allow insertion of a plastic cannula and the soft material prevents leakage during insertion and cannula detachment.

Figure 4:
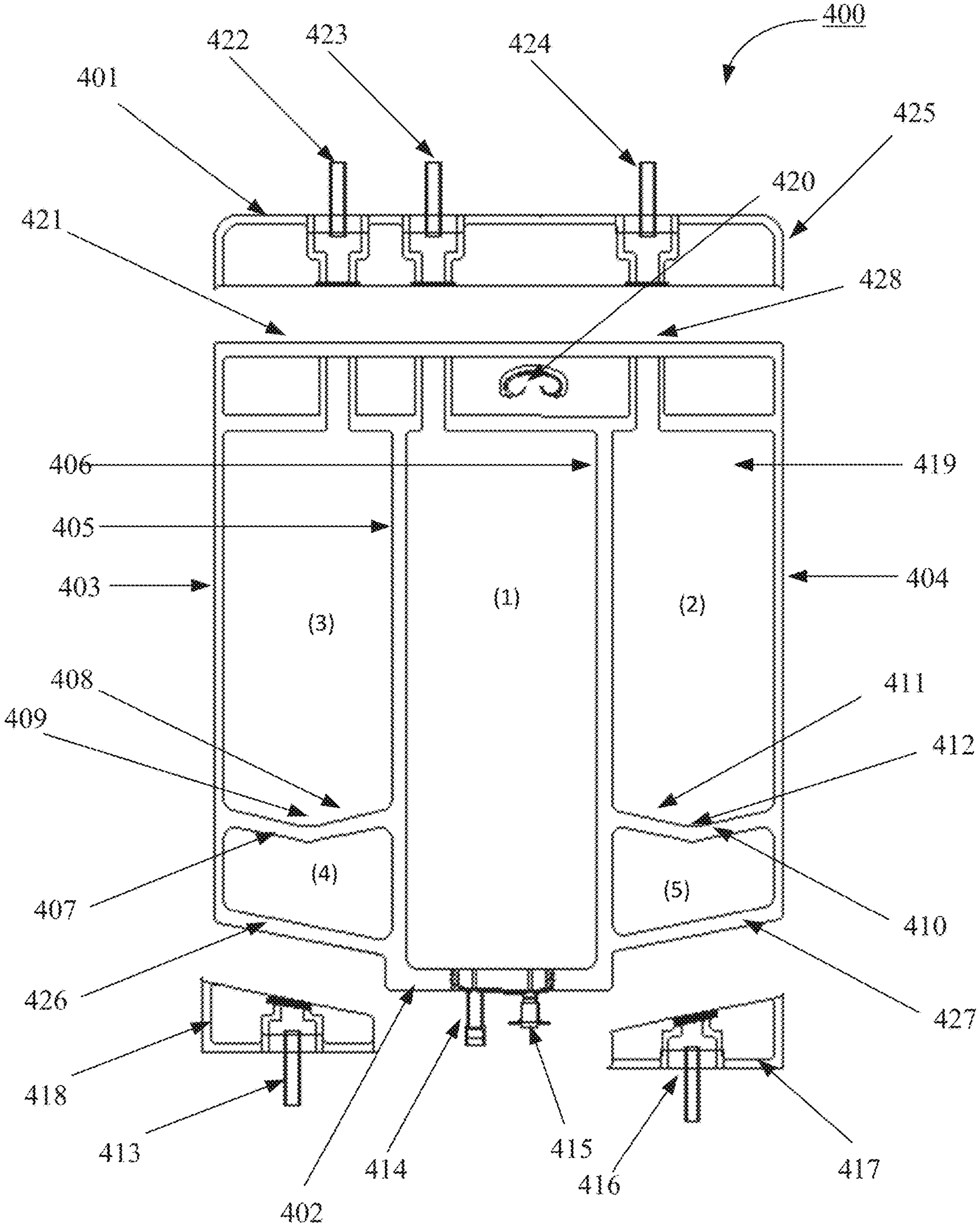
FIG. 4 is a schematic diagram showing a design of the MCB according to some embodiments of the present invention. The MCB of FIG. 4 can be filled from both sides—with combined molded port & wide small chamber. The MCB comprises port tubes for the first chamber (1), the second chamber (2) and the third chamber (3) at the top edge. The filling of the first chamber (1), the second chamber (2) and the third chamber (3) at the top edge allows one to consider a MCB design embodiment with small chambers (the fourth chamber (4) and the fifth chamber (5)) that are occupying the whole widths of respectively the right and left large chambers.

Referring to FIG. 4, a design of the MCB having small chambers having the same width as the adjacent large chambers according to some embodiments of the present invention is shown. The MCB 400 of FIG. 4 can be filled from both sides—with combined molded port & wide small chambers. The MCB 400 comprises port tubes for the first chamber (1), the second chamber (2) and the third chamber (3) at the top edge. The filling of the first chamber (1), the second chamber (2) and the third chamber (3) at the top edge allows one to consider a MCB design embodiment with small chambers (the fourth chamber (4) and the fifth chamber (5)) that are occupying the whole widths of respectively the right and left large chambers.

As shown in FIG. 4, the MCB 400 comprises a front surface 419, a back surface (not shown) and a hanger 420 adjacent to a top edge 401. The hanger 420 can be used for hanging the MCB 400 to an administration pole during the use of the MCB 400. The MCB 400 comprises two polymer films edge-sealed to form a first bag having a top edge 401, a bottom edge 402, a left edge 403 and a right edge 404, wherein the top edge 401, the bottom edge 402, the left edge 403 and the right edge 403 are non-peelably sealed.

A first plurality of tubes with sidewalls are non-peelably sealed between the two polymer films at the top edge 401 to form a first plurality of port tubes 422-424.

A second plurality of tubes with sidewalls are non-peelably sealed between the two polymer films at the bottom edge 402 to form a second plurality of port tubes 413-416.

As shown in FIG. 4, a first peelably sealing wall 405 and a second peelably sealing wall 406 between the two polymer films extending from the top edge 401 to the bottom edge 402 and separating the first bag into a first chamber (1) between the first peelably sealing wall 405 and the second peelably sealing wall 406, a first space between the left edge 403 and the first peelably sealing wall 405, a second space between the second peelably sealing wall 406 and the right edge 404.

A third peelably sealing wall (407, 408 and 409) is extending from the left edge 403 to the first peelably sealing wall 405 to separate the first space to form a third chamber (3) and a fourth chamber (4). As such, the third chamber (3) and the fourth chamber (4) have the same width.

A fourth peelably sealing wall (410, 411 and 412) is extending from the right edge 404 to the second peelably sealing wall 406 to separate the second space to form a second chamber (2) and a fifth chamber (5). As such, the second chamber (2) and the fifth chamber (5) have the same width.

In one embodiment, the third peelably sealing wall (407, 408 and 409) comprises a fifth peelably sealing wall 407 starting from an inner surface of the left edge 403 and a sixth peelably sealing wall 408 starting from the first peelably sealing wall, and both the fifth peelably sealing wall 407 and the sixth peelably sealing wall 408 connect at a first connection point 409 to form the third peelably sealing wall (407, 408 and 409).

In one embodiment, the left edge 403 and the fifth peelably sealing wall 407 have an angle greater than 90° toward the top edge direction, and the fifth peelably sealing wall 407 and the sixth peelably sealing wall 408 around the first connection point 408 have an angle in the range between 130° and 170°, between 140° and 165°, or between 150° and 160°.

In one embodiment, the left edge 403 and the fifth peelably sealing wall 407 have the angle of about 100° toward the top edge direction, and the fifth peelably sealing wall 407 and the sixth peelably sealing wall 408 around the first connection point 409 have an angle in the range between 150° and 160°.

In one embodiment, the left edge 403 and the fifth peelably sealing wall 407 have the angle of 102° toward the top edge direction, and the fifth peelably sealing wall 407 and the sixth peelably sealing wall 408 around the first connection point 409 have an angle of 156°.

In one embodiment, the fourth peelably sealing wall (410, 411 and 412) comprises a eighth peelably sealing wall 410 starting from an inner surface of the right edge 404 and a ninth peelably sealing wall 411 starting from the second peelably sealing wall 406, and both the eighth peelably sealing wall 410 and the ninth peelably sealing wall 411 connect at a second connection point 412 to form the fourth peelably sealing wall (410, 411 and 412).

In one embodiment, the right edge 404 and the eighth peelably sealing wall 410 have an angle greater than 90° toward the top edge direction, and the eighth peelably sealing wall 410 and the ninth peelably sealing wall 411 around the second connection point 412 have an angle in the range between 130° and 170°, between 140° and 165°, or between 150° and 160°.

In one embodiment, the right edge 404 and the eighth peelably sealing wall 410 have the angle about 100° toward the top edge direction, and the eighth peelably sealing wall 410 and the ninth peelably sealing wall 411 around the second connection point 412 have the angle in the range between 150° and 160°.

In one embodiment, the right edge 404 and the eighth peelably sealing wall 410 have the angle about 102° toward the top edge direction, and the eighth peelably sealing wall 410 and the ninth peelably sealing wall 411 around the second connection point 412 have the angle in the range of about 156°.

As shown in FIG. 4, in one embodiment, at least one of the first chamber (1), the second chamber (2) and the third chamber (3) connects to the first plurality of port tubes 422-424 at the top edge 401.

In one embodiment, each of the first chamber (1), the second chamber (2) and the third chamber (3) connects to the first plurality of port tubes 422-424 at the top edge 401. For example, the first chamber (1) connects to the port tube 423; the second chamber (2) connects to the port tube 424; and the third chamber (3) connects to the port tube 422.

In another embodiment, at least one of the fourth chamber (4) and the fifth chamber (5) connects to the second plurality of port tubes 413 and 416 at the bottom edge.

In one embodiment, each of the fourth chamber (4) and the fifth chamber (4) connects to the second plurality of port tubes 413 and 416. For example, the fourth chamber (4) connects to the port tube 413; and the fifth chamber (5) connects to the port tube 416.

In one embodiment, the first chamber (1) additionally connects to an administration port and/or a medication port at the bottom edge. In one embodiment, the first chamber (1) additionally connects to both an administration port and a medication port at the bottom edge. For example, the first chamber (1) additionally connects to the access system 310 of FIG. 3 comprising both an administration port 311 and a medication port 312.

In one embodiment, the flexible multi-chamber bag 400 comprises a first portion 425 near the top edge 401 comprising the first plurality of port tubes 422-424, and the first portion 425 is non-peelably sealed and removed from the flexible multi-chamber bag 400. FIG. 4 shows that the first portion 425 near the top edge 401 comprising the first plurality of port tubes 422-424 was removed from the flexible multi-chamber bag 400.

As shown in FIG. 4, the later non-peelable seals that lead to the removal of non-functional tubes 422-424, are pre-defined by a third plurality of non-peelable seals (e.g., 426, 427 and 428 of FIG. 4) that together form two ascending broken lines starting at the bottom edge of the middle chamber (1) and ending at the outer left (i.e., 426 of FIG. 4), right (i.e., 427 of FIG. 4) edge and top (i.e., 428 of FIG. 4) of the container. The plurality of non-peelable seals is created by splitting the second plurality of peelable seals (e.g., the first peelable seal 405 and the second peelable seal 406 in FIG. 4) and the outer non-peelable seals of the container (e.g., 403 and 404 in FIG. 4) into at least two non-peelable sealing walls (i.e., 426 and 427 of FIG. 4), respectively, and the at least two non-peelable sealing walls (i.e., 426 and 427 of FIG. 4) are non-peelably sealed to the bottom edge of the container. As shown in FIG. 4, the at least two non-peelable sealing walls (i.e., 426 and 427 of FIG. 4) are, in their first segment, directed upwards and downwards, respectively, to form the said ascending line, and further extend towards the bottom edge of the container in parallel with the right and left edge.

The slope of the non-peelable sealing walls 426 and 427 against the bottom edge 402 has an angle about 1-30°, about 5-15°, about 7-13°, about 8-12°, about 9-11.5°, preferably about 11°.

In one embodiment, the flexible multi-chamber bag 400 comprises a second portion 418 at the left corner of the flexible multi-chamber bag 400, the second portion 418 comprises the port tube 413 to the fourth chamber (4), and the second portion 418 is non-peelably sealed and removed from the flexible multi-chamber bag 400. FIG. 4 shows that the second portion 418 was non-peelably sealed and removed from the flexible multi-chamber bag 400.

In one embodiment, the flexible multi-chamber bag 400 comprises a third portion 417 at the right corner of the flexible multi-chamber bag 400, the third portion 417 comprises the port tube 416 to the fifth chamber (5), and the third portion 417 is non-peelably sealed and removed from the flexible multi-chamber bag 400. FIG. 4 shows that the third portion 417 was non-peelably sealed and removed from the flexible multi-chamber bag 400.

As shown in FIG. 4, after the removal of the first portion 425, the second portion 418 and the third portion 417, the remaining MCB 400 comprises a new top edge 421, and a funnel shape at the bottom edge 402, and an administration port 414 and a medication port 415.

Figures 5A, 5B, 5C, 5D:
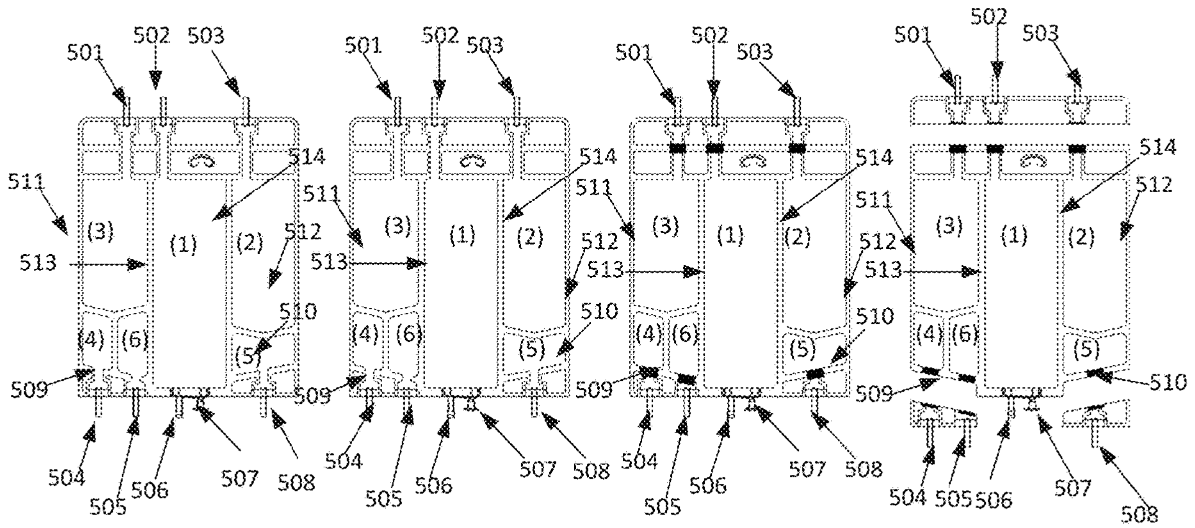
FIG. 5 (including FIG. 5*a*, FIG. 5*b*, FIG. 5*c* and FIG. 5*d*) is a set of schematic diagrams showing a manufacturing process for a six-chamber MCB filled from both sides—with combined molded port. The filling of the first chamber (1), the second chamber (2) and the third chamber (3) at the top edge from the hanger side allows to consider a container design embodiment with at least one of the small chambers (e.g., the fourth chamber (4) and/or the fifth chamber (5)) occupying the whole widths of respectively the right and left large chambers. It also allows considering a container design embodiment with a sixth chamber (6) which is achieved by splitting up one of the wide small chambers (4) or (5) such as shown in FIG. 4 into two separate chambers (4) and (6) or (5) and (6), respectively.

Referring now to FIG. 5 (including FIG. 5*a*, FIG. 5*b*, FIG. 5*c* and FIG. 5*d*), a manufacturing process for a six-chamber MCB which can be filled from both sides—with combined molded port is shown.

As shown in FIG. 5*a*, a six-chamber MCB comprises peelably sealing walls to separate the MCB into the first chamber (1), the second chamber (2), the third chamber (3), the fourth chamber (4), the fifth chamber (5) and the six chamber (6). Each of the first chamber (1), the second chamber (2) and the third chamber (3) comprises a port tube (502, 503 and 501) at the top edge side. Each of the fourth chamber (4), the fifth chamber (5) and the sixth chamber comprises a port tube (504, 508 and 505) at the bottom edge side. The first chamber (1) further comprises an administration port 506 and a medication port 507.

After the six-chamber MCB comprising peelably sealing walls forms, as shown in FIG. 5*b*, the contents are added through the port tubes into the corresponding chambers. For example, preferably, an amino acids solution, which optionally contains some vitamins or trace elements, is added into the first chamber (1) through the port tube 502 at the top edge side; a glucose solution, which optionally contains some vitamins or trace elements, is added into the second chamber (2) through the port tube 503 at the top edge side; a lipid emulsion, which optionally contains fat-soluble vitamins, is added into the third chamber (3) through the port tube 501 at the top edge side. A vitamins solution or emulsion is added into the fourth chamber (4) through the port tube 504 at the bottom edge side; a trace elements solution is added into the fifth chamber (5) through the port tube 508 at the bottom edge side; and another vitamins solution or emulsion is added into the sixth chamber (6) through the port tube 505 at the bottom edge side.

As shown in FIG. 5*c*, after the contents are added into the chambers through the corresponding port tubes, the port tubes 501-505 and 508 are non-peelably sealed from the corresponding chambers. In one embodiment, tunnels from the port tubes 501-505 and 508 to the corresponding chambers are non-peelably sealed.

After the port tubes 501-505 and 508 are non-peelably sealed from the corresponding chambers, as shown in FIG. 5*d*, a first portion of the MCB at the top edge comprising the port tubes 501-503 is cut and removed from the MCB. A second portion at the left corner and a third portion at the right corner at the bottom edge comprising the port tubes 504, 505 and 508 are also cut and removed from the MCB. As shown in FIG. 5*d*, the final MCB product comprises the administration port 506 and the medication port 507 at the first chamber (1). The final MCB product has a funnel shape at the bottom edge.

As shown in FIGS. 5*a*-5*d*, the later non-peelable seals that lead to the removal of non-functional tubes 504, 505 and 508, are pre-defined by a third plurality of non-peelable seals (e.g., 509 and 510 of FIGS. 5*a*-5*d*) that together form two ascending broken lines starting at the bottom edge of the middle chamber (1) and ending at the outer left (i.e., 509 of FIGS. 5*a*-5*d*) and right (i.e., 510 of FIGS. 5*a*-5*d*) edge of the container. The plurality of non-peelable seals is created by splitting the second plurality of peelable seals (e.g., non-peelable seals 513 and 514 in FIGS. 5*a*-5*d*) and the outer non-peelable seals of the container (e.g., 511 and 512 in FIGS. 5*a*-5*d*) into at least two non-peelable sealing walls (i.e., 509 and 510 of FIGS. 5*a*-5*d*), respectively, and the at least two non-peelable sealing walls (i.e., 509 and 510 of FIGS. 5*a*-5*d*) are non-peelably sealed to the bottom edge of the container. As shown in FIGS. 5*a*-5*d*, the at least two non-peelable sealing walls (i.e., 509 and 510 of FIGS. 5*a*-5*d*) are, in their first segment, directed upwards and downwards, respectively, to form the ascending line, and further extend towards the bottom edge of the container in parallel with the right and left edge.

The slope of the non-peelable sealing walls 509 and 510 against the bottom edge has an angle about 1-30°, about 5-15°, about 7-13°, about 8-12°, about 9-11.5°, preferably about 11°.

In one embodiment, the MCB of the present invention comprises at least three chambers, at least four chambers, or at least five chambers. In one embodiment, the MCB of the present invention comprises four, five, six, seven, eight or nine chambers. In one embodiment, the MCB of the present invention comprises five, six, seven or eight chambers. In one embodiment, the MCB of the present invention comprises five or six chambers. In one preferred embodiment, the MCB of the present invention comprises five chambers. In one preferred embodiment, the MCB of the present invention comprises six chambers.

In one embodiment, a sixth chamber of the present MCB is added aside to one of the small chambers (e.g., the fourth chamber (4) or the fifth chamber (5)). In one embodiment, a sixth chamber of the present MCB is added aside to the fourth chamber (4). In one embodiment of the present sixth MCB, the fifth chamber (5) is moved to the side of the MCB (e.g., the right edge). In one embodiment, one of the small chambers (e.g., the fourth chamber (4) or the fifth chamber (5)) can be split into two chambers and one of the two chambers is the sixth chamber (6).

In one embodiment, the present MCB with the fifth or sixth chamber has port tubes for each of the fifth or six chambers in the same side.

In one embodiment, the present MCB with the fifth or sixth chamber has port tubes for some of the fifth or six chambers in the different side from the others. For example, some of the port tubes are on the tope edge and the others are on the bottom edge.

In one embodiment, the present MCB with the fifth or sixth chamber has port tubes for each of the fifth or six chambers in the bottom edge.

In one embodiment, the "V" shape design of the MCBs provides the advantage to allow smooth propagation of the force from the above rupture zone decreasing the risk of burst upon activation.

In one embodiment, the shapes and sizes of the smaller chambers (the fourth chamber (4) and the fifth chamber (5)) may be further designed.

It is noted that there is a balance between stability of the peelably sealing walls surrounding the small chambers (e.g., the fourth chamber (4) and the fifth chamber (5)) versus an easy and complete opening and activation process during reconstitution. Either the peelably sealing walls were fine for the smooth opening and activation but for the price of increased leaks, or there were no leaks but it was difficult to reconstitute the MCB.

In one embodiment, the above balance may be addressed by carefully designing the geometrical shape of small chambers of the MCB (e.g., the fourth chamber (4) and the fifth chamber (5)).

For example, the "V" shape design of the small chambers (e.g., the fourth chamber (4) and the fifth chamber (5)) as disclosed herein allows for the desired stability of the seals versus easy and complete reconstitution. Thus, the "V" shape design with the specific range of the related angles of the small chambers has the advantage of smooth propagation of the force from the above rupture zone decreasing the risk of burst upon activation.

In one embodiment, the first chamber (1), the second chamber (2) and third chamber (3) are filled from the top edge side. The filling of chamber 1, 2 and 3 from the top edge side allows one to consider a MCB design embodiment with small chambers that are occupying the whole widths of respectively the right and left large chambers (e.g., the second chamber (2) and the third chamber (3)).

In one embodiment, the present MCB with the fifth or sixth chamber has port tubes for some of the fifth or six chambers in the different side from the others. For example, some of the port tubes are on the tope edge and the others are on the bottom edge.

In one embodiment, the present MCB with the fifth or sixth chamber has port tubes for each of the fifth or six chambers in the bottom edge.

In one embodiment, the first chamber comprises an amino acids solution; the second chamber comprises a glucose solution; the third chamber comprises a lipid emulsion; the fourth chamber comprises a vitamins solution or emulsion and the fifth chamber comprising a trace elements solution.

In one embodiment, it is also possible to have a sixth chamber which comprises vitamin A and optionally vitamins E, D and/or K, whereas vitamin B12 and optionally vitamins B2 and/or B5 remain in a fourth chamber. In such scenario, the respective vitamin formulations can be further optimized to support the stability of the respective contents for potentially even longer stability during shelf-life. However, a five-chamber bag would fully address the stability target as defined herein and would be preferable regarding ease of handling of the MCB, e.g. when reconstituting the formulation, and regarding manufacturing of such MCB. According to one aspect, the vitamin formulation of the sixth chamber is a lipid emulsion such as the one described before for the vitamin formulation, and accommodates therein the lipid-soluble vitamins A optionally in combination with vitamins D, E and/or K. In such case, the vitamin formulation of the fifth chamber preferably is an aqueous solution which has the potential to further increase the stability of vitamin B12. The pH of the vitamin formulation of the fifth chamber which accommodates vitamins B12 and optionally also vitamin B2 and/or B5 is in the range of from about 5.5 to about 6.5, such as, for example, about 5.8, about 5.9, about 6.0 or about 6.1. For adjusting the pH of the aqueous vitamin solution of the fifth chamber, which preferably is in the range of from 5.5 to 7.5, HCl and/or NaOH can be used as needed. Optionally, a phosphate monobasic buffer can be used.

According to another embodiment, one or more of the lipid-soluble vitamins can, however, be also accommodated in the lipid emulsion of the third chamber. For example, vitamin A and/or E may be present in the lipid emulsion, whereas the remaining vitamins, e.g., vitamin D and vitamin K, may be present in the vitamin formulation of the fourth or, alternatively, of the sixth chamber. According to one embodiment, vitamin A and one, two or all of the other lipid-soluble vitamins can be present in the lipid formulation of the third chamber, whereas the vitamin formulation is an aqueous solution as described above and which comprises vitamin B12 and, optionally, vitamins B2 and/or B5.

In one embodiment, specific geometries are required for the present MCB. For example, from the top edge to the bottom edge with a height of h2, the present MCB is firstly divided into three large chambers (e.g., the first chamber (1), the second chamber (2) and the third chamber (3)) by the first peelably sealing walls and their extensions. Then, after a certain distance, the second peelably sealing walls further separate the large walls to form the fourth chamber (4), the fifth chamber (5), optionally the sixth chamber (6). The second peelably sealing walls measured from the splitting point have a height of h1. In one preferred embodiment, h1 is below or equal to two third of h2 (h1≤2/3*h2).

Figure 6A:
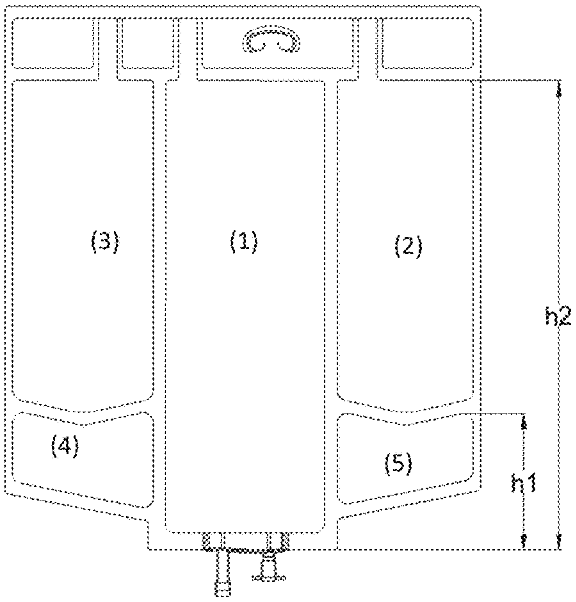
FIG. 6 (including FIG. 6*a* and FIG. 6*b*) is a set of schematic diagrams showing designs of the MCB with at least some small chambers occupying the whole widths of respectively the right and left large chambers according to some embodiments of the present invention. In a preferred embodiment, the width of the non-permanent seal (peelably sealing walls) is 8 mm. A smaller width can be envisaged below the split line (h1). The preferred angles geometries for the second, third, fourth and sixth preferred container design embodiments include: the peelably sealing walls coming from the hanger side first split with an obtuse angle greater than 90°, preferably near 100°. The peelably sealing walls separating the left and right chambers have an angle in the range between 130° and 170°, between 130° and 170°, preferably between 150° and 160°.

In one embodiment, the small chambers of the present MCB are symmetrical and/or each of the chambers has one port tube in the bottom edge. In one embodiment, the small chambers of the present MCB are unsymmetrical and/or each of the chambers initial had one port tube either at the top edge or at the bottom edge, which has been removed from the MCB. FIG. 6*a* shows an exemplary MCB with the fourth chamber (4) and the fifth chamber (5) (both are unsymmetrical) having the same width to that of the third chamber (3) and the second chamber (2), respectively. The MCB of FIG. 6*a* comprises only an administration port and a medication port at the first chamber (1). As shown in FIG. 6*a*, h1 is below or equal to two third of h2 (h1≤2/3*h2).

Figure 6B:
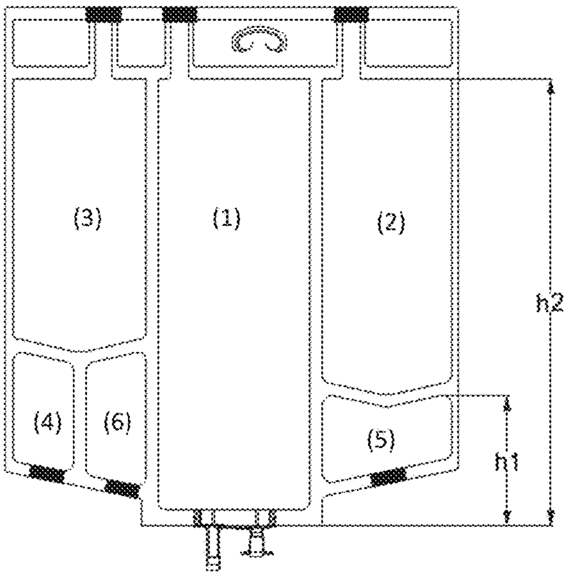

In one embodiment, the small chambers of the present MCB are unsymmetrical and/or each of the chambers initially had one port tube either at the top edge or at the bottom edge, which has been removed from the MCB. FIG. 6*b* shows an exemplary MCB with the fourth chamber (4) and the fifth chamber (5) being unsymmetrical and each of the first chamber (1), the second chamber (2) and the third chamber (3) had a port tube at the top edge and each of the fourth chamber (4) and the fifth chamber (5) had a port tube at the bottom edge. As shown in FIG. 6*b*, all the port tubes were removed, and the corresponding tunnels are non-peelably sealed. A seventh peelably sealing wall starts from the first connection point and extends to the bottom edge to separate the fourth chamber (4) to form a sixth chamber (6) between the seventh peelably sealing wall and the first peelably sealing wall.

As shown in FIG. 6*b*, h1 (height of the small chambers of the fifth chamber) is below or equal to two third of h2 (the height from the top edge to the bottom edge) (h1≤2/3*h2).

In one embodiment, the MCB of the present invention comprises six chambers. The three small chambers are unsymmetrical and/or each of the chambers had one port tube in the bottom edge, which has been removed. FIG. 6*b* shows an exemplary six-chamber MCB with a sixth chamber (6) forming within the original fourth chamber (4). All the fourth chamber (4), the fifth chamber (5) and the sixth chamber (6) are unsymmetrical and each of the first chamber (1), the second chamber (2) and the third chamber (3) has a port tube at the top edge. Each of the fourth chamber (4), the fifth chamber (5) and the sixth chamber (6) has a port tube in the bottom edge. In one embodiment, each of the port tubes is later removed. As shown in FIG. 6*b*, h1 is below or equal to two third of h2 (h1≤2/3*h2).

In one embodiment, the width of the peelably sealing walls is in the range of about 1 mm to about 15 mm, about 2 mm to about 14 mm, about 3 mm to about 13 mm, about 4 mm to about 12 mm, about 5 mm to about 11 mm, about 6 mm to about 10 mm, about 7 mm to about 9 mm, about 7.5 mm to about 8.5 mm, preferably about 8 mm. In one preferred embodiment, the width of the peelably sealing walls is about 8 mm. In one embodiment, a smaller width can be envisaged below the split line (h1) of the specific designs of FIGS. 6-7. In one embodiment, a larger width can be envisaged near the port tubes.

In one embodiment, the width of the non-peelably sealing walls (e.g., the walls form the left edge 103, the right edge 104, the top edge 101 and the bottom edge 102 in FIG. 1*a*) is in the range of about 1 mm to about 15 mm, about 1.5 mm to about 14.5 mm, about 2 mm to about 14 mm, about 3 mm to about 13 mm, about 3.2 mm to about 12.5 mm, about 4 mm to about 12 mm, about 4.5 mm to about 11.5 mm, about 5 mm to about 11 mm, about 5.5 mm to about 10.7 mm, about 6 mm to about 10 mm, about 7 mm to about 9 mm, about 7.5 mm to about 8.5 mm. In one preferred embodiment, the width of the non-peelably sealing walls is about 3.2 mm. In another preferred embodiment, the width of the non-peelably sealing walls is about 4.5 mm. In another preferred embodiment, the width of the non-peelably sealing walls is about 10.7 mm. In one embodiment, a small width (e.g., a minimal of about 2 mm for horizontal walls; a minimal of 1.5 mm for vertical walls) can be expected for the non-peelably sealing walls.

FIG. 7 (including FIG. 7*a* and FIG. 7*b*) is a set of schematic diagrams showing designs of certain MCBs with preferred angle geometries. For example, FIG. 7*a* shows a MCB 800 with six-chambers with preferred angle geometries to form the small chambers.

As shown in FIG. 7*a*, a first peelably sealing wall 801 and a second peelably sealing wall 802 between the two polymer films extending from the top edge to the bottom edge and separating the first bag into a first chamber (1) between the first peelably sealing wall 801 and the second peelably sealing wall 802, a first space between the left edge 803 and the first peelably sealing wall 801, a second space between the second peelably sealing wall 802 and the right edge 810.

A third peelably sealing wall (804, 805 and 806) is extending from the left edge 803 to the first peelably sealing wall 801 to separate the first space to form a third chamber (3) and a space comprising both a fourth chamber (4) and a sixth chamber (6).

In one embodiment, a seventh peelably sealing wall 811 starts from the first connection point 806 and extends to the bottom edge to separate the space to form both the fourth chamber (4) and the sixth chamber (6) and the sixth chamber is between the seventh peelably sealing wall 811 and the first peelably sealing wall 801.

A fourth peelably sealing wall (808, 807 and 809) is extending from the right edge 810 to the second peelably sealing wall 802 to separate the second space to form a second chamber (2) and a fifth chamber (5). As such, the second chamber (2) and the fifth chamber (5) have the same width.

In one embodiment, the third peelably sealing wall (804, 805 and 806) comprises a fifth peelably sealing wall 804 starting from an inner surface of the left edge 803 and a sixth peelably sealing wall 805 starting from the first peelably sealing wall 801, and both the fifth peelably sealing wall 804 and the sixth peelably sealing wall 805 connect at a first connection point 806 to form the third peelably sealing wall (804, 805 and 806).

In one embodiment, the left edge 803 and the fifth peelably sealing wall 804 have an angle greater than 90° toward the top edge direction, and the fifth peelably sealing wall 804 and the sixth peelably sealing wall 805 around the first connection point 806 have an angle in the range between 130° and 170°, between 140° and 165°, or preferably between 150° and 160°.

In one embodiment, the left edge 803 and the fifth peelably sealing wall 804 have the angle of about 100° toward the top edge direction, and the fifth peelably sealing wall 804 and the sixth peelably sealing wall 805 around the first connection point 806 have an angle in the range between 150° and 160°.

In one embodiment, the left edge 803 and the fifth peelably sealing wall 804 have the angle of 102° toward the top edge direction, and the fifth peelably sealing wall 804 and the sixth peelably sealing wall 805 around the first connection point 806 have an angle of 156°.

In one embodiment, the fourth peelably sealing wall (808, 807 and 809) comprises an eighth peelably sealing wall 808 starting from an inner surface of the right edge 810 and a ninth peelably sealing wall 807 starting from the second peelably sealing wall 802, and both the eighth peelably sealing wall 808 and the ninth peelably sealing wall 807 connect at a second connection point 809 to form the fourth peelably sealing wall (808, 807 and 809).

In one embodiment, the right edge 810 and the eighth peelably sealing wall 808 have an angle greater than 90° toward the top edge direction, and the eighth peelably sealing wall 808 and the ninth peelably sealing wall 807 around the second connection point 809 have an angle in the range between 130° and 170°, between 140° and 165°, or between 150° and 160°.

In one embodiment, the right edge 810 and the eighth peelably sealing wall 808 have the angle about 100° toward the top edge direction, and the eighth peelably sealing wall 808 and the ninth peelably sealing wall 807 around the second connection point 809 have the angle in the range between 150° and 160°.

In one embodiment, the right edge 810 and the eighth peelably sealing wall 808 have the angle about 102° toward the top edge direction, and the eighth peelably sealing wall 808 and the ninth peelably sealing wall 807 around the second connection point 809 have the angle in the range of about 156°.

As shown in FIG. 7*a*, in one embodiment, at least one of the first chamber (1), the second chamber (2) and the third chamber (3) connects to the first plurality of port tubes at the top edge.

In one embodiment, each of the first chamber (1), the second chamber (2) and the third chamber (3) connects to the first plurality of port tubes at the top edge.

In another embodiment, at least one of the fourth chamber (4) and the fifth chamber (5) connects to the second plurality of port tubes at the bottom edge.

In one embodiment, each of the fourth chamber (4) and the fifth chamber (4) connects to the second plurality of port tubes.

In one embodiment, the first chamber (1) additionally connects to an administration port and/or a medication port at the bottom edge. In one embodiment, the first chamber (1) additionally connects to both an administration port and a medication port at the bottom edge. For example, the first chamber (1) additionally connects to the access system 310 of FIG. 3 comprising both an administration port 311 and a medication port 312.

As shown in FIG. 7*a*, the MCB 800 includes non-peelable seals 812, 813 and 821 that lead to the removal of non-functional tubes 815-820. The non-peelable seals 812 and 813 of FIG. 7*a* together form two ascending broken lines starting at the bottom edge of the middle chamber (1) and ending at the outer left (i.e., 803 of FIG. 7*a*), right (i.e., 810 of FIG. 7*a*) edge. The non-peelable seal 821 is parallel to the top edge and the bottom edge 814 of the MCB 800. The non-peelable seals 812 and 813 are created by splitting a first plurality of peelable seals (e.g., the first peelable seal 801 and the second peelable seal 802 in FIG. 7*a*) and the outer non-peelable seals of the container (e.g., 803 and 810 in FIG. 7*a*) into at least two non-peelable sealing walls (i.e., 812 and 813 of FIG. 7*a*), respectively, and the at least two non-peelable sealing walls (i.e., 812 and 813 of FIG. 7*a*) are non-peelably sealed to the bottom edge 814 of the container. As shown in FIG. 7*a*, the at least two non-peelable sealing walls (i.e., 812 and 813 of FIG. 7*a*) are, in their first segment, directed upwards and downwards, respectively, to form the said ascending line, and further extend towards the bottom edge 814 of the container in parallel with the right and left edge.

The slope of the non-peelable sealing walls 812 and 813 against the bottom edge 402 has an angle about 1-30°, about 5-15°, about 7-13°, about 8-12°, about 9-11.5°, preferably about 11°.

FIG. 7*b* shows a MCB 900 with five-chambers and the small chambers having the same width as the adjacent large chambers.

As shown in FIG. 7*b*, a first peelably sealing wall 901 and a second peelably sealing wall 902 between the two polymer films extending from the top edge to the bottom edge and separating the first bag into a first chamber (1) between the first peelably sealing wall 901 and the second peelably sealing wall 902, a first space between the left edge 903 and the first peelably sealing wall 901, a second space between the second peelably sealing wall 902 and the right edge 910.

A third peelably sealing wall (904, 905 and 906) is extending from the left edge 903 to the first peelably sealing wall 901 to separate the first space to form a third chamber (3) and a fourth chamber (4). As such, the third chamber (3) and the fourth chamber (4) have the same width.

A fourth peelably sealing wall (908, 907 and 909) is extending from the right edge 910 to the second peelably sealing wall 902 to separate the second space to form a second chamber (2) and a fifth chamber (5). As such, the second chamber (2) and the fifth chamber (5) have the same width.

In one embodiment, the third peelably sealing wall (904, 905 and 906) comprises a fifth peelably sealing wall 904 starting from an inner surface of the left edge 903 and a sixth peelably sealing wall 905 starting from the first peelably sealing wall 901, and both the fifth peelably sealing wall 904 and the sixth peelably sealing wall 905 connect at a first connection point 906 to form the third peelably sealing wall (904, 905 and 906).

In one embodiment, the left edge 903 and the fifth peelably sealing wall 904 have an angle greater than 90° toward the top edge direction, and the fifth peelably sealing wall 904 and the sixth peelably sealing wall 905 around the first connection point 906 have an angle in the range between 130° and 170°, between 140° and 165°, or preferably between 150° and 160°.

In one embodiment, the left edge 903 and the fifth peelably sealing wall 904 have the angle of about 100° toward the top edge direction, and the fifth peelably sealing wall 904 and the sixth peelably sealing wall 905 around the first connection point 906 have an angle in the range between 150° and 160°.

In one embodiment, the left edge 903 and the fifth peelably sealing wall 904 have the angle of 102° toward the top edge direction, and the fifth peelably sealing wall 904 and the sixth peelably sealing wall 905 around the first connection point 906 have an angle of 152°.

In one embodiment, the fourth peelably sealing wall (908, 907 and 909) comprises an eighth peelably sealing wall 908 starting from an inner surface of the right edge 910 and a ninth peelably sealing wall 907 starting from the second peelably sealing wall 902, and both the eighth peelably sealing wall 908 and the ninth peelably sealing wall 907 connect at a second connection point 909 to form the fourth peelably sealing wall (908, 907 and 909).

In one embodiment, the right edge 910 and the eighth peelably sealing wall 908 have an angle greater than 90° toward the top edge direction, and the eighth peelably sealing wall 908 and the ninth peelably sealing wall 907 around the second connection point 909 have an angle in the range between 130° and 170°, between 140° and 165°, or preferably between 150° and 160°.

In one embodiment, the right edge 910 and the eighth peelably sealing wall 908 have the angle about 100° toward the top edge direction, and the eighth peelably sealing wall 908 and the ninth peelably sealing wall 907 around the second connection point 909 have the angle in the range between 150° and 160°.

In one embodiment, the right edge 910 and the eighth peelably sealing wall 908 have the angle about 102° toward the top edge direction, and the eighth peelably sealing wall 908 and the ninth peelably sealing wall 907 around the second connection point 909 have the angle in the range of about 156°.

As shown in FIG. 7*b*, the MCB 900 includes non-peelable seals 911, 912 and 919 that lead to the removal of non-functional tubes 914-918. The non-peelable seals 911 and 912 of FIG. 7*b* together form two ascending broken lines starting at the bottom edge of the middle chamber (1) and ending at the outer left (i.e., 911 of FIG. 7*b*), right (i.e., 912 of FIG. 7*b*) edge. The non-peelable seal 919 is parallel to the top edge and the bottom edge 913 of the MCB 900. The non-peelable seals 911 and 912 are created by splitting a first plurality of peelable seals (e.g., the first peelable seal 901 and the second peelable seal 902 in FIG. 7*b*) and the outer non-peelable seals of the container (e.g., 903 and 910 in FIG. 7*b*) into at least two non-peelable sealing walls (i.e., 911 and 912 of FIG. 7*b*), respectively, and the at least two non-peelable sealing walls (i.e., 911 and 912 of FIG. 7*b*) are non-peelably sealed to the bottom edge 913 of the MCB 900. As shown in FIG. 7*b*, the at least two non-peelable sealing walls (i.e., 911 and 912 of FIG. 7*b*) are, in their first segment, directed upwards and downwards, respectively, to form the said ascending line, and further extend towards the bottom edge 913 of the container in parallel with the right and left edge.

The slope of the non-peelable sealing walls 911 and 912 against the bottom edge 402 has an angle about 1-30°, about 5-15°, about 7-13°, about 8-12°, about 9-11.5°, preferably about 11°.

As shown in FIGS. 7*a* and 7*b*, in one embodiment, at least one of the first chamber (1), the second chamber (2) and the third chamber (3) connects to the first plurality of port tubes at the top edge.

In another aspect, the present invention relates to an "all-in-one" parenteral nutrition system comprising parenteral nutrition solutions in the flexible MCB as disclosed herein. In one embodiment, the "all-in-one" parenteral nutrition system comprising: the first chamber comprising an amino acids solution; the second chamber comprising a glucose solution; the third chamber comprising a lipid emulsion; the fourth chamber comprising a vitamins solution or emulsion; and the fifth chamber comprising a trace elements solution.

In one embodiment, the first chamber further comprises vitamins or trace elements as discussed in this disclosure or understood by the skilled artisan.

In one embodiment, the second chamber further comprises vitamins or trace elements as discussed in this disclosure or understood by the skilled artisan.

In one embodiment, the third chamber further comprises fat-soluble vitamins as discussed in this disclosure or understood by the skilled artisan.

In one embodiment, each of the first chamber, the second chamber, the third chamber, the fourth chamber and the fifth chamber comprises one port tube for addition of contents into the chambers.

In one embodiment, the port tube for each of the third chamber, the fourth chamber and the fifth chamber is sealed or closed after the addition of the contents into the chambers.

In one embodiment, portions comprising port tubes for the second chamber, the third chamber, the fourth chamber and the fifth chamber are non-peelably sealed from the rest of the flexible multi-chamber bag and the port-tube containing portions are cut.

In one embodiment, the flexible multi-chamber bag comprises at least one port tube at the top edge for the first chamber, the second chamber and/or the third chamber.

In one embodiment, a portion comprising port tubes at the top edge for the first chamber, the second chamber and/or the third chamber is non-peelably sealed from the rest of the flexible multi-chamber bag and the port-tube containing portions are cut.

In one embodiment, a portion comprising the at least one port tube at the top edge for the first chamber, the second chamber and/or the third chamber is non-peelably sealed and removed from the rest of the flexible multi-chamber bag.

In a further aspect, the present invention relates to a method of manufacturing the "all-in-one" parenteral nutrition system as discussed in this disclosure. The method comprising:

(a) producing the flexible multi-chamber bag, the flexible multi-chamber bag comprising:
the first chamber comprising a first port tube;
the second chamber comprising a second port tube;
the third chamber comprising a third port tube;
the fourth chamber comprising a fourth port tube; and
the fifth chamber comprising a fourth port tube,
wherein the first chamber extends from the top edge of the flexible multi-chamber bag to the bottom edge of the flexible multi-chamber bag;
(b) adding an amino acids solution into the first chamber through the first port tube;
(c) adding a glucose solution into the second chamber through the second port tube;
(d) adding a lipid emulsion into the third chamber through the third port tube;
(e) adding a vitamins solution or emulsion into the fourth chamber through the fourth port tube;
(f) adding a trace elements solution into the fifth chamber through the fifth port tube; and
(g) sealing the first port tube, the second port tube, the third port tube, the fourth port tube and the fifth port tube.

In one embodiment, the method further comprises sealing portions comprising the first port tube, the second port tube, the third port tube, the fourth port tube and the fifth port tube.

In another embodiment, the method further comprises cutting the portions comprising the third port tube, the fourth port tube and the fifth port tube from the flexible multi-chamber bag to form the "all-in-one" parenteral nutrition system.

In one embodiment, the present MCB, the "all-in-one" parenteral nutrition system and related methods have many advantages over the existing products.

For example, the five- or six-chamber MCBs with the small chambers at the bottom would lead to a single-step activation. Rolling the bag from the top is enough to allow the opening of the peelably sealing walls and complete mixing of the chambers contents. Thus, the present MCB design allows the opening of the five or six chambers simultaneously, in a mistake-proof way, so that the MCB prevents by design the occurrence of incomplete activation of the bag (for example a partial activation where only some chambers would open at the same time) which would lead to an incomplete therapy.

The present MCB allows designing various bag formats keeping the filling tube distances unchanged across a portfolio, and is thus beneficial from a manufacturing complexity standpoint. No deep modification to the filling line is therefore required across the different MCB sizes.

The present MCB would prevent the undesired (from a stability standpoint) mixing between high concentrated glucose (e.g., the second chamber (2)) and trace elements (e.g., the fifth chamber (5)—strongly acidic) solutions with the two emulsion chambers (e.g., the third and fourth chambers (3), (4) and optionally the sixth chamber (6)), leveraging the buffer Amino Acid solution in the middle (the first chamber (1)).

The "V" shape used for the small chambers in some embodiments are beneficial for both risks of the bag bursting upon activation and easiness of activation. The "V" shapes have the advantage to allow smooth propagation of the force from the above rupture zone decreasing the risk of burst upon activation.

The seal and cut process also provides the following advantages:

- It improves the overall user experience by having an improved 'Look & Feel' perception of the product.
- It eliminates the risk of product misuses, keeping on the final product only the required tubes and closures without any dummy port which could be wrongly used by the user.
- It ensures better drainage of the residual content, thanks to the shape obtained after cutting.
- It reduces the risk of leakages around the tubes with fewer tubes.

According to another aspect of the invention, the carbohydrate formulation of the present invention may comprise vitamin B1, vitamin B3 and vitamin B6, preferably together with calcium chloride as calcium source. If calcium is present, the calcium concentration preferably is from about 5.0 mmol/L to about 15.0 mmol/L of carbohydrate solution. The carbohydrate formulation preferably contains from about 50.0 g to about 180.0 g of glucose, even though other carbohydrates could also be used. Glucose anhydrous or glucose monohydrate can be used, for example, for preparing the carbohydrate formulation. Vitamin B1 can be added as thiamin chloride, but other forms can be used as well. Vitamin B3 can be added, for example, as nicotinamide, and vitamin B6 as pyridoxine. The pH of the carbohydrate formulation preferably is in the range of about 3.2 to about 5.5. The carbohydrate formulation may comprise certain excipients, such as, HCl which will generally be used as HCl of about 25% w/w to adjust the pH of the formulation during production. Otherwise, the formulation may contain nitrogen and will contain water for injection. The composition is designed in way to allow stable provision of glucose and especially also the vitamins mentioned during preparation of the formulation, including terminal heat-sterilization, storage, reconstitution, and administration. In the final, reconstituted formulation for administration, the glucose concentration will be in the range of from about 60 g/L to about 160 g/L.

According to another aspect of the invention, the amino acid formulation or solution may comprise vitamin B8, vitamin B9 and vitamin C, optionally together with various electrolytes that can also be accommodated in the amino acid formulation. For example, the electrolytes contained in the amino acid formulation according to the invention encompass sodium acetate trihydrate, potassium chloride, magnesium chloride hexahydrate and sodium glycerophosphate. The amino acid formulation preferably comprises from about 4.0 g/100 mL to about 20.0 g/100 mL amino acids. Vitamin B8 can be added, for example, as biotin, vitamin B9 as folic acid, and vitamin C as ascorbic acid. The pH of the amino acid formulation is preferably in the range of from about 5.0 to about 7.0, more preferably in the range of from about 5.9 to about 6.9. The amino acid formulation may further comprise excipients such as acetic acid, glacial, which can be used for adjusting the pH of the formulation, nitrogen, and water for injection. The composition is designed in a way to allow stable accommodation of amino acids, electrolytes and especially also the vitamins in the MCB according to the invention during preparation of the formulation, including terminal heat-sterilization, storage, reconstitution, and administration.

It was a critical step forward to distribute the respective vitamins over the respective formulations of the present invention in a way to avoid instabilities and incompatibilities between the vitamins or with compounds and/or conditions in the various chambers, that still must contain the macronutrients in a stable way, and adjust various parameters, including, for example, presence and/or combination with other vitamins, pH, and potentially dissolved oxygen, without compromising on critical excipients, shelf life and storage temperatures. It is a special achievement that also vitamin A and vitamin B12 can be stably accommodated in the MCB according of the invention.

Furthermore, in various formulation studies, when attempting to introduce trace elements into nutrition multi-chamber bags, serious stability issues have been experienced, in particular the loss of selenium has been observed. This may be due to the fact that selenium in the form of sodium selenite (and selenious acid) is prone to adsorption, for example to plastic materials or iron oxides; can be reduced into metallic selenium in the presence of reducing agents like ascorbic acid; can be reduced into hydrogen selenide, which is a volatile substance; and/or can be transformed into selenious dioxide at low pH, which is also a volatile substance under certain conditions. Furthermore, nutritional solutions comprising selenate salts are unknown in the state of the art. In addition to selenium, iodine, fluoride, and copper also showed stability issues during formulation trials. Copper is a reactive entity and can catalyze various chemical reactions and it is known that it can precipitate. Iodide can be reduced into iodine, which is potentially volatile. Furthermore, fluoride showed a decreasing concentration over time.

Accordingly, to date there is no sterilized, ready-to-use parenteral nutrition solution available that stably comprises a solution for parenteral administration to a patient in need thereof, comprising selenium and preferably also zinc, copper and manganese, which is stable over a prolonged period of time. Parenteral nutrition solutions which are terminally sterilized and ready-to-use and further comprise, for example, iron, chromium, iodine, fluoride and/or molybdenum in one ready-to-use MCB for PN are even more difficult to provide due to instability and/or incompatibility of one or more of the components either with each other or with the compounds and/or conditions of the standard macronutrient formulations. Selenium and other trace elements are, therefore, generally manually added to the ready-made solutions shortly before administration, because currently applicable guidelines for parenteral nutrition recommend the addition of at least zinc, copper, manganese and selenium for meeting the nutritional requirements of patients and for avoiding harmful effects if said trace elements are not provided in sufficient amounts. See, for example, Vanek et al., *A.S.P.E.N. Nutrition in Clinical Practice* 2012, 27:440-491; Osland et al., *Australasian Society for Parenteral and Enteral Nutrition (AuSPEN) adult vitamin guidelines for parenteral nutrition.* Asia Pac J of Clin Nutr 2016, 25 (3):636-650; or Blaauw et al. *Parenteral Provision of Micronutrients to Adult Patients: An Expert Consensus Paper. JPEN J Parenter Enteral Nutr.* 2019 March; 43 Suppl 1:S5-S23.

According to the invention, preferably at least selenium, zinc, copper, and manganese are present in the MCB of the invention, preferably in the trace element formulation. One or more of the trace elements iron, chromium, iodine, fluorine, and molybdenum can be added, for example iron and chromium or any other combination of iron, chromium, molybdenum, iodine and fluorine. According to another embodiment, the trace element formulation thus comprises at least selenium, zinc, copper, manganese, and iron. According to another embodiment, the trace element formulation comprises at least selenium, zinc, copper, manganese, iron, and chromium. According to another embodiment, the trace element formulation comprises at least selenium, zinc, copper, manganese, and chromium. According to another embodiment, the trace element formulation comprises at least selenium, zinc, copper, manganese, and iodine. According to another embodiment, the trace element formulation comprises at least selenium, zinc, copper, manganese, iodine, and iron. According to another embodiment, the trace element formulation comprises at least selenium, zinc, copper, manganese, iodine, chromium, and iron. According to another embodiment, the trace element formulation comprises at least selenium, zinc, copper, manganese, iodine, molybdenum, and iron. According to another embodiment, the trace element formulation comprises at least selenium, zinc, copper, manganese, chromium, iodine, fluorine, and iron. According to another embodiment, the trace element formulation comprises at least selenium, zinc, copper, manganese, iodine, fluorine, molybdenum, chromium, and iron. According to another embodiment, the trace element formulation comprises at least selenium, zinc, copper, manganese, iodine, molybdenum, chromium, and iron.

The trace elements can be added to the MCB in different forms or as different salts which can act as a source for the respective trace element. For example, sources of selenium that can be used in the context of the invention are, for example, sodium selenite, potassium selenite, selenious acid, selenium dioxide, selenomethionine, selenocysteine, and sodium selenate. Regarding zinc, iron, copper and chromium, the respective chloride, gluconate or sulfate salts can be used. Fluoride and iodine can be provided by adding, for example, potassium iodide or sodium iodide, and sodium fluoride or potassium fluoride. Sources of molybdenum that can be used according to the invention are for example, sodium molybdate dihydrate, potassium molybdate, molybdenum chloride, molybdenum sulfate, or molybdenum glycinate. For example, the trace element formulation according to the invention can comprise sodium selenite, zinc chloride, copper chloride, manganese chloride, iron chloride, chromium chloride, potassium iodide, sodium fluoride, and/or sodium molybdate dihydrate. As will be readily understood by persons skilled in the art, amounts may vary with the size (total reconstituted volume) of the MCB of the invention and/or the targeted patient group, for example, pediatric or adult patients.

It will be readily understood by the skilled person, that the preferred amounts shown in this disclosure can be reduced or enlarged without deviating from the present invention, which is largely unrelated to amounts used.

According to one embodiment, the trace elements encompassed by the MCB according to the invention are located in the trace element formulation. However, selected trace elements, that are less critical as to their requirements for stability may also be accommodated elsewhere, such as, for example, in the glucose chamber. It will be readily understood by the skilled person that the concentrations of the trace elements within the MCB of the invention may vary, depending on the volume of the formulation or chamber they are located in, while their total amount per MCB as disclosed herein will remain in the disclosed ranges. For example, the volume of the trace element chamber may vary over a certain range, such as, for example, from about 2.5 mL to about 100 mL, such as, for example, from about 5 mL to about 50 mL, and from about 10 mL to about 30 mL. Accordingly, the concentrations of the respective trace elements in a given formulation, such as the trace element formulation, can vary. Following reconstitution, the concentration of the respective trace elements, depending on the total volume of the reconstituted multi-chamber bag, may be, for example, in the range of (a) from about 2200 μg/L to about 7500 μg/L zinc, for example from about 2400 μg/L to about 7400 μg/L, or from about 2400 μg/L to about 4900 μg/L, such as, for example, about 2500 μg/L, about 3200 μg/L, about 4500 μg/L, about 4800 μg/L, about 5500 μg/L, about 6000 μg/L, about 6800 μg/L or about 7350 μg/L;

(b) from about 450 μg/L to about 1500 μg/L iron, for example from about 480 μg/L to about 1470 μg/L, or from about 480 μg/L to about 1000 μg/L, such as, for example, about 490 μg/L, about 550 μg/L, about 650 μg/L, about 970 μg/L, about 1100 μg/L, about 1300 μg/L or about 1450 μg/L;

(c) from about 130 μg/L to about 475 μg/L copper, for example from about 140 μg/L to about 450 μg/L, or from about 140 μg to about 300 μg/L, such as, for example, about 150 μg/L, about 200 μg/L, about 300 μg/L, about 400 μg/L, or about 450 μg/L;

(d) from about 20 μg/L to about 100 μg/L manganese, for example from about 25 μg/L to about 85 μg/L, or from about 25 μg/L to about 55 μg/L, such as, for example, about 27 μg/L, about 35 μg/L, about 54 μg/L, about 65 μg/L, about 75 μg/L, or about 80 μg/L;

(e) from about 3 μg/L to about 18 μg/L chromium, for example from about 4 μg/L to about 16 μg/L, or from about 4 μg/L to about 10 μg/L, such as, for example, about 5 μg/L, about 7 μg/L, about 10.0 μg/L, about 12 μg/L, or about 15 μg/L;

(f) from about 25 μg/L to about 120 μg/L selenium, for example from about 30 μg/L to about 110 μg/L, or from 30 μg/L to about 70 μg/L, such as, for example, about 35 μg/L, about 50 μg/L, about 60 μg/L, about 70 μg/L, about 80 μg/L, about 90 μg/L, or about 100 μg/L;

(g) from about 35 μg/L to about 175 μg/L iodine, for example from about 40 μg/L to about 150 μg/L, or from about 40 μg/L to about 100 μg/L, such as, for example, about 50 μg/L, about 65 μg/L, about 80 μg/L, about 90 μg/L, about 100 μg/L, about 125 μg/L, or about 150 μg/L;

(h) from about 450 μg/L to about 1500 μg/L fluorine, for example from 480 μg/l to about 1480 μg/L, or from about 480 μg/L to about 1000 μg/L, such as, for example, about 490 μg/L, about 650 μg/L, about 970 μg/L, about 1050 μg/L, about 1250 μg/L, or about 1470 μg/L;

(i) from about 5 μg/L to about 30 μg/L molybdenum, for example from about 8 μg/L to about 30 μg/L, or from about 8 μg/L to about 20 μg/L, such as, for example, about 10 μg/L, about 13 μg/L, about 20 μg/L, about 25 μg/L, and about 30 μg/L.

The skilled person will be aware that the concentrations refer to the respective trace element and not to the respective salt or other form of the trace element. For example, if zinc is said to be present in a concentration of 4850 μg/L in the trace element formulation, this corresponds to a concentration of zinc chloride ($ZnCl_2$) of 10.1 mg/L.

According to one embodiment of the invention, the trace element chamber has a pH of from about 2.0 to about 4.0, which is especially beneficial for stabilizing the trace element formulation according to the invention. It is also possible to adjust the pH to a range of from about 2.0 to about 3.5 or select a pH range of from about 2.5 to about 3.2. Such pH is specifically beneficial for stabilizing selenium. The stability at such acidic pH conditions is important, in particular if the solution also includes other trace elements that may not be stable at neutral pH, but only under acidic conditions. This is, for example, the case for iodide (I), which has been reported to be more stable in solutions with acidic pH.

According to one aspect of the invention, the trace element formulation comprises an acid, which can be an inorganic or an organic acid. According to one embodiment, an organic acid selected from the group comprising malic acid, tartaric acid, citric acid, maleic acid, fumaric acid, more preferably malic acid is used, wherein the concentration of the organic acid is preferably in the range of from about 50 mM to about 400 mM, preferably from about 190 mM to about 220 mM, and more preferably about 200 mM.

In another embodiment, the solution comprises malic acid. In embodiments, the solution comprises malic acid at a concentration in the range of from about 50 mM to about 400 mM, preferably from about 190 mM to about 220 mM, such as, for example, about 140 to about 180 mM or about 160 mM to about 200 mM. The use of malic acid in the context of a parenteral nutrition product is particularly advantageous since it is an organic acid that naturally occurs in fruits, such as apples, apricots, blackberries, blueberries, cherries, grapes, peaches and others and is particularly well tolerated by human subjects when administered in the context of a nutritional product.

In certain embodiments of the invention, the MCB comprises selenium in the form of selenite, such as, for example, sodium selenite. In some embodiments, the solution of the medical product of the invention comprises selenous acid. In some embodiments, the solution of the medical product of the invention comprises selenium dioxide. In one embodiment, dissolved oxygen is used for stabilization of sodium selenite, selenous acid and/or selenium dioxide in an environment which is otherwise protected from the interchange of gases with its surrounding.

It is highly preferable that the multi-chamber container or at least the chamber of the container containing the Se(IV)-comprising trace element formulation is able to stabilize the DO content between about 0.5 and about 8 ppm. According to the invention, this can be realized in different ways, such as, for example, by making use of an oxygen-impermeable film material where an oxygen absorber is added to the primary pouch to protect other formulations contained in the MCB of the invention that require the absence of oxygen. In addition, ports that are in fluid communication with the trace element chamber comprising selenite should preferably be attached or sealed into the container in a way that ensures the chamber containing the solution comprising Se(IV) is sealed in an oxygen tight manner, to the extent possible. An inevitable loss of oxygen, for example, through the port seals where oxygen absorbers are used, can be addressed according to the invention with an appropriate headspace used as a reservoir of e.g. oxygen to assure the stability of Se(IV) for the intended shelf-life. In embodiments, the chamber comprising the solution containing selenium comprises a port that is essentially oxygen impermeable.

As used herein, the term "shelf life" relates to the time that the medical product of the invention can be stored at defined storage conditions after sealing and sterilizing. Depending on the storage conditions, shelf life may vary.

A selenite (Se(IV)) containing trace element formulation according to the invention can be prepared by the steps comprising:

(a) dissolving sodium selenite, selenous acid or selenium dioxide in a liquid medium, preferably water for injection, (b) further dissolving an acid, preferably an organic acid selected from the group comprising malic acid, tartaric acid, citric acid, maleic acid and fumaric acid, (c) further dissolving zinc, copper, and manganese, and (d) adjusting the solution to a concentration of dissolved oxygen of from about 0.5 ppm to about 8 ppm, preferably to more than about 4 ppm and more preferably to more than about 6 ppm.

Following steps (a) to (d), the trace element formulation is filled into the chamber of the MCB intended for holding the trace element formulation and the chamber can be sealed. Preferably, the fill tube is then removed. The other chambers of the MCB can be filled simultaneously, before or after filling the trace element chamber. After overpouching the primary container, the MCB can be terminally heat sterilized, e.g. by moist heat sterilization.

According to one embodiment of the invention, selenium can also be provided as selenate, for example as sodium selenate, selenomethionine or selenocysteine. It is a particular advantage that selenate salts, selenomethionine and/or selenocysteine are stable also in solutions with an acidic pH such as preferably used for the trace element formulation according to the invention, and not only at about neutral pH in the range of about 7 to about 7.5 as would have been expected. In addition, it was also found that the stability of selenate is positively affected by the presence of an inorganic or organic acid, especially by the presence of an organic acid selected from the group comprising malic acid, tartaric acid, citric acid, maleic acid, fumaric acid, more preferably malic acid, wherein the concentration of the organic acid is preferably in the range of from about 50 mM to about 400 mM, preferably from about 190 mM to about 220 mM, and more preferably about 200 mM, as mentioned already for selenite.

Trace element formulations comprising a selenate as disclosed before can be prepared in analogy to the formulations comprising selenite, including the conditions for sterilization.

Accordingly, it is one aspect of the present invention that the trace element formulation according to the invention can also contain a selenate, such as sodium selenate, as a selenium source within an MCB according to the invention. Selenate remains equally stable as selenite and may be an excellent alternative to selenite in MCBs according to the invention.

Carbohydrate formulations such as the carbohydrate formulation used in accordance with the invention provide a supply of calories, typically in the form of glucose. In particular, the carbohydrate formulation provides an amount of carbohydrate sufficient to avoid adverse effects such as hyperglycemia that has been observed in patients receiving parenteral nutrition. A broad range of carbohydrate formulations can be used according to the invention, including carbohydrate formulation used in currently marketed products. Typically, the carbohydrate formulation includes about 20 to about 50 grams of glucose per 100 mL of carbohydrate formulation. Carbohydrates comprise glucose, sucrose, ribose, amylose (a major component of starch), amylopectin, maltose, galactose, fructose, and lactose. As mentioned elsewhere, the carbohydrate formulation preferably has a pH of from about 3.2 to about 5.5, such as, for example, from about 3.5 to about 4.8, which is beneficial for stably accommodating vitamins according to the invention.

As used herein, amino acid formulations include a sterile, aqueous solution of one or more amino acids and one or more electrolytes. Typically, amino acid formulations that can be used in amino acid formulation provided in MCBs for PN according to the invention include from about 4 grams to about 25 grams of amino acids per 100 mL of amino acid formulation, such as about 3 grams to about 20 grams per 100 mL of amino acid formulation, about 4 grams to about 17 grams per 100 mL of amino acid formulation, or about 4 grams to about 12 grams per 100 mL of amino acid formulation, such as, for example, about 4 g/100 mL, about 5 g/100 ml, about 6 g/100 mL, about 7 g/100 mL, about 8 g/100 mL, about 9 g/100 mL, about 10 g/100 mL, about 11 g/100 mL, about 12 g/100 mL, about 13 g/100 mL, about 14 g/100 mL, about 15 g/100 mL, about 16 g/100 mL, about 17 g/100 mL, about 18 g/100 mL, about 19 g/100 mL, or about 20 g/100 mL. Amino acids which are included into amino acid formulations are, for example, selected from the group consisting of alanine (Ala), arginine (Arg), aspartic acid (Asp), glutamic acid (Glu), glutamine (Gln), glycine (Gly), histidine (His), leucine (Leu), isoleucine (Ile), lysine (Lys), methionine (Met), phenylalanine (Phe), proline (Pro), serine (Ser), threonine (Thr), tryptophan (Trp), tyrosine (Tyr), valine (Val), cysteine (Cys), ornithine (Orn), taurine and asparagine (Asn). The amino acid formulations according to the invention can further comprise oligopeptides consisting of at least three amino acids and/or dipeptides selected from the group consisting of Acetyl-cysteine (Ac-Cys), Acetyl-Tyrosine (Ac-Tyr), Alanyl-glutamine (Ala-Gln), Glycyl-glutamine (Gly-Gln), and glycyl-tyrosine (Gly-Tyr). Further, the content of tyrosine can be increased by adding, for example, a glycyl-tyrosine dipeptide or acetyl-tyrosine (Ac-Tyr). Typically, however, the glycyl-tyrosine dipeptide has improved pharmacokinetics compared to Ac-Tyr, which is more rapidly eliminated by the kidney, resulting in diminished release of tyrosine in the blood.

According to one embodiment, the amino acid formulation of the present invention comprises the amino acids alanine, arginine, aspartic acid, glutamic acid, glycine, histidine, isoleucine, leucine, lysine, methionine, phenylalanine, proline, serine, threonine, tryptophane, tyrosine, and valine. Said amino acids can be present in the amino acid formulation in a broader range of concentration. Typical concentrations ranges are known in the prior art.

For example, the amino acid formulation according to the invention depending also on the volume and size of the multi-chamber bag and the amino acid chamber of the invention, can include from about 3.0 g to about 25 g alanine (e.g., from about 3.5 g to about 22 g), from about 2.0 g to about 18.0 g arginine (e.g., from about 2.4 g to about 15 g), from about 0.5 g to about 6.0 g aspartic acid (e.g., from about 0.7 g to about 4.5 g), from about 0.6 g to about log glutamic acid (e.g., from about 1.2 g to about 7.7 g), from about 1.2 g to about 12.0 g glycine (e.g., from about 1.6 g to about 11.0 g), from about 1.0 g to about 11.0 g histidine (e.g., from about 1.4 g to about 10.0 g), from about 0.8 g to about 10.0 g isoleucine (e.g., from about 1.1 g to about 8.0 g), from about 1.0 g to about 12.0 g leucine (e.g., from about 1.5 g to about 11.0 g), from about 1.0 g to about 14.0 g lysine (e.g., from about 1.5 g to about 12 g), from about 0.6 g to about 9.0 g methionine (e.g., from about 1.0 g to about 8.0 g), from about 1.2 g to about 12.0 g phenylalanine (e.g., from about 1.5 g to about 11.0 g), from about 0.8 g to about 12.0 g proline (e.g., from about 1.0 g to about 10.0 g), from about 0.5 g to about 8.0 g serine (e.g., from about 0.8 g to about 6.5 g), from about 0.8 g to 10.0 g threonine (e.g., from about 1.0 g to about 8.0 g), from about 0.04 g to about 0.5 g tyrosine (e.g., from about 0.05 g to about 0.4 g), from about 0.3 g to about 3.5 g tryptophane (e.g., from about 0.4 g to about 2.8 g), and from about 1.0 g to about 12.0 g valine (e.g., from about 1.5 g to about 10.0 g).

According to another embodiment, the amino acid formulation according to the invention, depending on the volume of the amino acid chamber, may contain from about 6.0 g to about 22 g alanine per liter of amino acid formulation; from about 4.0 g to about 15 g arginine per liter of amino acid formulation; from about 1.0 g to about 5.0 g aspartic acid per liter of amino acid formulation; from about 2.0 g to about 10.0 g of glutamic acid per liter of amino acid formulation; from about 2.8 g to about 12.0 g glycine per liter of amino acid formulation; from about 2.0 g to about 10.0 g histidine per liter of amino acid formulation; from about 2.0 g to about 8.0 g isoleucine per liter of amino acid formulation; from about 3.0 g to about 10.0 g leucine per liter of amino acid formulation; from about 3.0 g to about 12.0 g lysine per liter of amino acid formulation; from about 2.0 g to about 8.0 g methionine per liter of amino acid formulation; from about 2.8 g to about 11.0 g phenylalanine per liter of amino acid formulation; from about 2.0 g to about 10.0 g proline per liter of amino acid formulation; from about 1.0 g to about 7.0 g serine per liter of amino acid formulation; from about 1.8 g to about 9.0 g threonine per liter of amino acid formulation; from about 0.3 g to about 0.5 g to about 3.2 g tryptophane per liter of amino acid formulation; from about 0.09 g to about 0.5 g tyrosine per liter of amino acid formulation; and from about 2.8 g to about 11.0 g valine.

According to another embodiment, once reconstituted, the flexible multi-chamber bag of the invention provides for a reconstituted solution wherein amino acids are present in a concentration of, for example, from about 3.0 g/L to about 12.0 g/L alanine; from about 1.9 g/L to about 8.5 g/L arginine; from about 0.5 g/L to about 2.6 g/L aspartic acid; from about 0.8 g/L to about 4.5 g/L glutamic acid; from about 1.4 g/L to about 6.0 g/L glycine; from about 1.0 g/L to about 5.5 g/L histidine; from about 0.9 g/L to about 4.5 g/L isoleucine; from about 1.4 g/L to about 6.0 g/L leucine; from about 1.4 g/L to about 6.5 g/L lysine; from about 0.8 g/L to about 4.5 g/L methionine; from about 1.4 g/L to about 5.5 g/L phenylalanine; from about 1.0 g/L to about 5.2 g/L proline; from about 0.5 g/L to about 3.5 g/L serine; from about 0.8 g/L to about 4.2 g/L threonine; from about 0.3 g/L to about 1.6 g/L tryptophane; from about 0.05 g/L to about 0.21 g/L tyrosine; and from about 1.2 g/L to about 5.2 g/L valine.

The amino acid formulation according to the invention may further include electrolytes. As used herein, electrolytes include sodium, potassium, chloride, calcium, magnesium, acetate, hydrogen carbonate, and/or phosphate, which is, for example, provided in the form of hydrogen phosphate or dihydrogen phosphate or as glycerophosphate, such as sodium glycerophosphate. For example, if an inorganic phosphate source is present, calcium will be provided in another chamber of the MCB, such as in the carbohydrate formulation and/or the trace element formulation. This is not mandatory where an organic phosphate source such as, for example, sodium glycerophosphate, is used.

The amino acid formulation according to the invention preferably comprises sodium ($Na^+$), potassium ($K^+$), magnesium ($Mg^{2+}$), glycerophosphate ($C_3H_7O_6P^{2-}$), acetate ($CH_3COO^-$), and chloride ($Cl^-$). Said electrolytes can be present in the amino acid formulation and the resulting reconstituted solution in a relatively wide range. Typical ranges are known in the prior art.

For example, the amino acid formulation according to the invention, depending also on the volume or size of the multi-chamber bag and the amino acid chamber of the invention, can include from about 0.1 mmol to about 10 mmol of sodium (e.g., about 3.75 mmol to about 10 mmol of sodium), from about 0.1 mmol to about 10 mmol of potassium (e.g., about 3.75 mmol to about 6.90 mmol of potassium), from about 0.05 mmol to about 1.0 mmol of magnesium (e.g., about 0.05 mmol to about 0.11 mmol and/or about 0.38 mmol to about 0.65 mmol of magnesium), from about 0.1 mmol to about 10 mmol of calcium (e.g., about 1.13 mmol to about 5.10 mmol of calcium), from about 0.1 mmol to about 10 mmol of phosphate (e.g., about 0.94 mmol to about 5.10 mmol of phosphate) and not more than 10 mmol of chloride (e.g., not more than 5.6 mmol of chloride) per 100 mL of amino acid formulation. When calcium and phosphorus are present together in the same heat-sterilized solution, insoluble calcium phosphate precipitation can occur. Using an organic salt of phosphorus such as sodium glycerophosphate or calcium glycerophosphate, calcium and phosphate amounts may be increased without solubility issues and without providing excess sodium or chloride. In the amino acid formulation, sodium may be provided in the form of sodium chloride or sodium acetate trihydrate; calcium may be provided in the form of calcium chloride dihydrate or calcium gluconate, magnesium may be provided in the form of magnesium acetate tetrahydrate or magnesium chloride hexahydrate, phosphate can be provided as sodium glycerophosphate and potassium may be provided in the form of potassium acetate or potassium chloride.

According to one embodiment of the invention, sodium is provided as sodium acetate trihydrate, potassium is provided as potassium chloride, magnesium is provided as magnesium chloride hexahydrate, and phosphate is provided as sodium glycerophosphate, hydrated. Accordingly, amino acid formulations according to the invention can contain from about 1.0 g to about 4.0 g sodium acetate trihydrate (e.g., about 1.1 g, about 1.5 g, about 1.8 g, about 2.0 g, about 2.3 g, about 3.0 g or about 3.5 g of sodium acetate trihydrate); from about 1.0 g to about 5 g of potassium chloride (e.g., about 1.2 g, about 1.8 g, about 2.0 g, about 2.2 g, about 2.5 g, about 2.8 g, about 3.0 g, about 3.5 g, about 4.0 g, or about 4.5 g potassium chloride); from about 0.3 g to 2.0 g magnesium chloride hexahydrate (e.g., about 0.4 g, about 0.5 g, about 0.6 g, about 0.7 g, about 0.8 g, about 0.9 g, about 1.0 g, about 1.1 g, about 1.2 g, about 1.4 g, about 1.6 g, about 1.8 g magnesium chloride hexahydrate); and from about 1.0 g to about 9.0 g sodium glycerophosphate 5·H2O (e.g., about 1.5 g, about 1.8 g, about 2.0 g, about 2.4 g, about 2.8 g, about 3.2 g, about 3.5 g, about 3.8 g, about 4.2 g, about 4.6 g, about 5.2 g, about 5.6 g, about 6.0 g, about 6.5 g, about 7.0 g, about 7.4 g, or about 7.8 sodium glycerophosphate 5·H2O)

According to another embodiment, the amino acid formulation of the invention comprises from about 1.8 g sodium acetate per liter of amino acid formulation to about 3.5 g sodium acetate per liter of amino acid formulation, such as, for example, from about 2.0 g/L to about 3.0 g/L. According to another embodiment, the amino acid formulation of the invention comprises from about 2.0 g potassium chloride per liter of amino acid formulation to about 5.0 g potassium chloride per liter of amino acid formulation, such as, for example, from about 2.0 g/L to about 4.2 g/L. According to another embodiment, the amino acid formulation of the invention comprises from about 0.4 g magnesium chloride per liter of amino acid formulation to about 2.0 g magnesium chloride per liter of amino acid formulation, such as, for example, from about 0.7 g/L to about 1.7 g/L. According to yet another embodiment, the amino acid formulation of the invention comprises from about 2.5 g sodium glycerophosphate $5\cdot H_2O$ per liter of amino acid formulation to about 8.0 g sodium glycerophosphate $5\cdot H_2O$ per liter of amino acid formulation, such as, for example, from about 3.3 g/L to about 7.0 g/L.

Lipid formulations such as mentioned in the context of the present invention are an emulsion of an oil phase, a water phase, and an emulsifier that makes the two phases miscible. In case of lipid emulsions, which are to be used as an injectable emulsion for parenteral nutrition, the emulsion must be an oil-in-water (o/w) emulsion. This means that the oil must reside in the internal (or dispersed) phase, while water is the external (or continuous) phase, as the emulsion must be miscible with blood. Lipid emulsion as disclosed herein must therefore also be substantially free of any suspended solids. Of course, the lipid emulsions may contain further components, including, but not limited to, antioxidants, pH modifiers, isotonic agents, and various combinations thereof. Lipids emulsions often contain low amounts of vitamins such as, for example, vitamin E. Vitamin E, especially α-tocopherol, is, for example, present in olive oil or in certain fish oils as well as in various emulsion blends. Plant germs and seeds, as well as their oils, and products derived from them are also containing vitamin E. In wheat germ, sunflower seeds, cottonseed, and olive oil, α-tocopherol makes up most (50%-100%) of the vitamin E.

An overview over lipid emulsions, their composition and use is provided, for example, in Driscoll, Journal of Parenteral and Enteral Nutrition 2017, 41, 125-134. Further information on the use of lipid emulsions in parenteral nutrition of intensive care patients is provided, for example, in Calder et al, Intensive Care Medicine, 2010, 36(5), 735-749.

Typically, the oil phase of the lipid emulsion may include polyunsaturated fatty acids, such as long-chain polyunsaturated fatty acids, which may be present as the free acid, as an ionized or salt form of the free acid, and/or in ester form. Suitable esters of the polyunsaturated fatty acids/long-chain polyunsaturated fatty acids include, but are not limited to, alkyl esters (e.g., methyl esters, ethyl esters, propyl esters, or combinations thereof) and triglyceride esters. In some cases, the long-chain polyunsaturated fatty acid has a structure R(C═O)OR', wherein R is an alkenyl group having at least 17 carbon atoms, at least 19 carbon atoms, at least 21 carbon atoms, or at least 23 carbon atoms, and R' is absent, H, a counter ion, an alkyl group (e.g., methyl, ethyl, or propyl), or a glyceryl group (e.g., R(C═O)OR' is a monoglyceride, a diglyceride, or a triglyceride). Polyunsaturated fatty acids for use in the lipid formulations disclosed herein include, but are not limited to, linoleic acid (LA), arachidonic acid (ARA), α-linolenic acid (ALA), eicosapentaenoic acid (EPA), docosahexaenoic acid (DHA), stearidonic acid (SDA), γ-linolenic acid (GLA), dihomo-γ-linolenic acid (DPA), and docosapentaenoic acid (DPA), particularly, DHA, ARA, and EPA, each of which may be present in free acid form, ionized or salt form, alkyl ester form, and/or triglyceride form. In some cases, the polyunsaturated fatty acids and/or long-chain fatty acids are present in triglyceride form.

Typically, the lipid formulation includes about 5% to about 35% by weight of an oil phase based on the total weight of the lipid emulsion. For example, the oil phase of the lipid formulation is present in an amount of about 8% to 12%, of about 10% to about 20%, of about 10% to about 15%, of about 15% to about 20%, of about 12% to about 17%, of about 18% to 22% and/or about 20% by weight based on the total weight of the lipid formulation. The oil phase typically and preferably contains, in various amounts depending on the source of the oil, omega-3 fatty acids. The three types of omega-3 fatty acids involved in human metabolism are eicosapentaenoic acid (EPA) and docosahexaenoic acid (DHA), both of which are usually found in marine fish oils and α-linolenic acid (ALA), commonly found in plant oils.

The oil phase and its components can be derived from a single source or different sources (see, for example, Fell et al, Advances in Nutrition, 2015, 6(5), 600-610). Of the plant oils, currently used sources include, but are not limited to, soybean and olive oil as well as coconut or palm kernel oil. Another source are algae, including microalgae such as *Crypthecodinium cohnii* and *Schizochytrium* sp., which in some cases serve as the single source of the long-chain polyunsaturated fatty acid docosahexaenoic acid (DHA). Marine oil used in parenteral lipid emulsions is processed from oily fish primarily found in cold water and including, but not limited to, herring, shad and sardines. However, other marine organisms can be used as an oil source, such as, for example, krill, such as Antarctic krill (Euphausia superba Dana). Krill oil, for example, provides for both EPA and DHA, in amounts of up to 35% w/w of the fatty acids.

The lipid emulsions referred to herein may further include additional components, such as surfactants (also referred to as emulsifiers), co-surfactants, isotonic agents, pH adjusters, and antioxidants. Generally, surfactants are added to stabilize emulsions by reducing the interfacial tension between the oil phase and the aqueous phase. Surfactants typically include a hydrophobic part and a hydrophilic part, and the amount of surfactant/emulsifier included in the formulations is determined based on the amount that is needed to achieve a desired level of stabilization of the emulsion. Typically, the amount of surfactant in the lipid formulation is about 0.01% to about 3% by weight based on the total weight of the lipid formulation, for example, about 0.01% to about 2.5% by weight. Suitable surfactants and co-surfactants include surfactants that are approved for parenteral use, and include, but are not limited to, phospholipids (e.g., egg phosphatide and soy lecithin), oleate salts, and combinations thereof. Krill oil can also be used as an emulsifier in the lipid emulsion, wherein the lipid emulsion comprises about 0.5 to about 2.2 wt % krill oil based on the total weight of the emulsion, and wherein the emulsion is free of egg yolk lecithin (US 2018/0000732 A1). Another exemplary surfactant is lecithin, including both natural and synthetic lecithin, such as lecithins derived from egg, corn or soybean or mixtures there-of. In some cases, lecithin is included in an amount of about 1.2% based on the total weight of the lipid formulation.

In some cases, the lipid emulsion formulation includes a cosurfactant. Typically, the amount of co-surfactant in the lipid formulation is less than the amount of surfactant, and typically the amount of co-surfactant in the formulation is about 0.001% to about 0.6% by weight based on the total weight of the lipid formulation. An exemplary co-surfactant is oleate, such as sodium oleate. In some cases, the lipid formulation includes lecithin and oleate as surfactant and co-surfactant, for example, an in amount of about 1.2% lecithin and about 0.03% oleate. In some cases, sodium oleate is included in an amount of about 0.03% by weight based on the total weight of the lipid formulation.

Isotonic agents can be added to the lipid emulsions to adjust the osmolarity of the lipid emulsion to a desired level, such as a physiologically acceptable level. Suitable isotonic agents include, but are not limited to, glycerol. Typically, the lipid emulsion formulation has an osmolarity of about 180 to about 300 milliosmole/liter, such as about 190 to about 280 milliosmole/liter. In some cases, the lipid emulsion includes an isotonic agent in an amount of about 1% to about 10% by weight based on the total weight of the lipid. In some cases, the lipid emulsion formulation includes about 2% to about 3% by weight of glycerol.

pH modifiers can be added to the lipid emulsions to adjust the pH to a desired level, such as a physiologically acceptable pH for parenteral use. Suitable pH modifiers include but are not limited to sodium hydroxide and hydrochloric acid.

The lipid formulation according to the invention can be prepared according to generally known processes (see, for example, Hippalgaonkar et al, AAPS PharmSciTech 2010, 11(4), 1526-1540 or WO 2019/197198 A1)).

According to one embodiment of the invention, the lipid formulation according to the invention is an association of refined olive oil and refined soya oil in a ratio of 80/20, comprising about 15% saturated fatty acids (SFA), about 65% monounsaturated fatty acids (MUFA), 20% polyunsaturated essential fatty acids (PUFA), and wherein the phospholipid/triglyceride ratio is about 0.06. Such composition can be especially beneficial in the context of the invention because olive oil naturally contains alpha tocopherol which, combined with a moderate PUFA intake, contributes to reduce lipid peroxidation. Therefore, it should be noted that in the context of the invention the lipid formulations (both the lipid formulation present in the third chamber and the lipid formulation forming the basis of the vitamin formulation, where applicable) may naturally contain certain amounts of vitamin E. However, amounts and concentrations provided for vitamin E in the context of the invention relate to vitamin E that is added to the respective formulations and does not encompass any naturally occurring vitamin E in said lipid emulsions to which vitamin E is added.

In some embodiments of the invention, the multi-chamber bag can be provided without the lipid formulation provided in the third chamber. For example, there are circumstances when it is undesirable to include a lipid emulsion into the MCB, or admix such lipid formulation with the formulations of the other chambers, for example in products dedicated to pediatric patients, specifically to neonates or infants, for example those under septic status, coagulation abnormalities, high bilirubin level, or for other reasons.

According to one embodiment, the MCB is provided with a non-peelably sealing wall between the lipid formulation in the third chamber and the other chambers that is permanent and not openable. The admixture and the separate lipid emulsion may then be administered separately without requiring selective activation of the openable seals. Administration ports are then provided on two of the chambers such that one administration port is provided so that the lipid emulsion chamber separated by the permanent seal may be administered (or may not be administered) while a second administration port is provided to allow the admixture of the remaining formulations to be administered.

According to yet another embodiment, the seal between the lipid chamber and the remaining chambers is openable but can be selectively activated as described, for example, in U.S. Pat. No. 8,485,727B2 when provided in a container configuration that allows for selective opening of the seals.

According to another embodiment, the multi-chamber bag of the invention does not comprise a lipid formulation in a third chamber but is provided without said macronutrient formulation. In such case, the flexible multi-chamber container having peelably sealing walls comprises at least:

(a) a first chamber comprising a carbohydrate formulation and vitamins, (b) a second chamber comprising an amino acid formulation and vitamins, (c) a third chamber comprising a trace element formulation, and (d) a fourth chamber comprising a vitamin formulation, wherein the vitamin formulation comprises at least vitamin B12, and wherein the trace element formulation comprises at least selenium (Se).

According to one embodiment, the vitamin formulation in such scenario is a lipid emulsion having a pH of from about 5.0 to about 7.0 and comprises an aqueous phase, and about 1% to about 20% by weight of an oil phase based on the total weight of the lipid emulsion and preferably contains less than 1.5 ppm of dissolved oxygen as described above, wherein the vitamin formulation further comprises vitamin A and optionally at least one vitamin selected from the group of vitamins comprising or consisting of vitamin D, vitamin E and vitamin K. According to yet another embodiment, the vitamin formulation may further comprise vitamin B2 and/or vitamin B2. For example, the vitamin formulation may comprise vitamin B12 and vitamin A, or may comprise vitamin B12, vitamin A, vitamin D, vitamin E and vitamin K, or it may comprise vitamin B12, vitamin B2, vitamin B5, vitamin A, vitamin D, vitamin E and vitamin K. Other combinations according to the invention are also possible.

According to a further embodiment, the vitamin formulation of the said fourth chamber is an aqueous solution having a pH of from about 5.0 to about 7.0, and comprises vitamin B12 and optionally at least one vitamin selected from the group of vitamins consisting of vitamin B2 and vitamin B5, and optionally comprises less than 1.5 ppm dissolved oxygen. For example, the aqueous vitamin formulation may comprise vitamin B12, vitamin B2 and vitamin B5.

According to yet another embodiment, when the fourth chamber comprises a vitamin formulation which is an aqueous formulation as described above, the MCB according to the invention may comprise a fifth chamber which comprises another vitamin formulation which is a lipid emulsion having a pH of from 5.0 to 7.0 and comprises an aqueous phase, and 1% to 20% by weight of an oil phase based on the total weight of the lipid emulsion and optionally contains less than 1.5 ppm of dissolved oxygen, wherein the vitamin formulation further comprises vitamin A and optionally at least one vitamin selected from the group of vitamins comprising or consisting of vitamin D, vitamin E and vitamin K.

In the context of the present invention, the multi-chamber bag is a flexible container. Flexible containers or bags of the invention can be made of materials comprising, without limitation, polyvinyl chloride (PVC), polypropylene (PP), polyethylene (PE), ethylene vinyl alcohol (EVOH), ethylene-vinyl acetate (EVA) and all possible copolymers, essentially any synthetic material suitable for containing the components to be administered.

For example, oxygen impermeable flexible containers are made of gas barrier films that block oxygen migration to the outside of the container. Such a container can for example comprise an oxygen barrier film, preferably with an oxygen permeability of less than 50 cc/m$^2$/day. Different technologies have been developed to provide oxygen barrier to transparent films, such as PE films or polyethylene terephthalate films. The main technologies are the following: (1) Coating with high barrier materials, generally inorganic oxide layers (e.g., SiOx or $Al_2O_3$); (2) Multilayer films, wherein an inner layer consists a barrier material such as EVOH, polyamide, aluminum, halogenated polyvinylidene such as PVDC, amorphous nylon or crystalline nylon or combination of both, copolymers of ethylene vinyl alcohol copolymer layer (EVOH), polyolefins, including combinations of two or more of the above layers, and wherein the outer layers consist of structural polymer (e.g. PE, PP or PET).

The multi-chamber bag according to the invention may be prepared from any of the before-mentioned flexible films. Suitable containers, including soft bags, typically are sterile, non-pyrogenic, single-use, and/or ready-to-use. Such multi-chamber containers are particularly useful for holding a parenteral nutrition product.

The flexible multi-chamber container according the invention, such as a five-chamber or six-chamber bag, may have various configurations wherein, for example, the five, six or even more chambers can be arranged vertically and/or horizontally, as long as the peelably sealing walls between them allow for the reconstitution of the MCB and its various formulations in a way that the amino acid formulation which functions as a buffering solution is essentially admixed first with formulations having a relatively low pH, such as the carbohydrate formulation. The outside seals of the multi-chamber container are non-peelably sealing walls that do not open under the fluid pressure supplied and the physical force (e.g., rolling the top edge) to open the weaker peelably sealing walls between the chambers. In some embodiments, the peelably sealing walls of the multi-chamber container may be designed to allow for the admixing or reconstitution of only selected chambers of the multichambered container, for example, the admixing of the lipid emulsion with the vitamin formulation and the amino acid formulation, if so desired.

The chambers of the MCB of the invention may have the same size or may have different sizes to accommodate the various formulations which may different volumes. The chambers may be designed to contain volumes of from, for example, about 1 to about 5 ml, from about 5 to about 10 ml, from about 10 to about 50 ml, from about 50 to about 100 ml, from about 100 to about 250 ml, from about 250 ml to about 500 ml, from about 500 to about 1000 ml, from about 1000 to about 1500 ml. The MCBs can be designed to have chambers which are located adjacent to each other. The chambers may have various shapes. The chambers can be oriented horizontally and/or vertically to each other.

For example, the amino acid chamber of the MCB according to the invention can have a volume of from about 320 mL to about 1200 mL, for example from about 400 mL to about 1200 mL. Typical volumes of the amino acid formulation encompass, for example, about 500 mL, about 800 mL or about 1000 mL. However, larger or smaller volumes are also possible, such as, for example, about 350 mL, if the MCB is designed to provide reconstituted volumes of about 500 mL to about 800 mL only.

The carbohydrate formulation generally has a somewhat smaller volume compared to the amino acid formulation. Volumes of the carbohydrate formulation can have a range of from about 150 mL to about 600 mL, for example from about 250 mL to 550 mL. Typical volumes of the carbohydrate chamber according to the invention are, for example, about 250 mL, about 400 mL or about 550 mL. However, larger or smaller volumes are also possible, such as, for example, about 180 mL, if the MCB is designed to provide reconstituted volumes of about 500 mL to about 800 mL only.

The lipid formulation is generally provided in volumes of from about 100 mL to about 500 mL, for example from about 120 mL to about 450 mL. Typical volumes of the amino acid formulation encompass, for example, about 200 mL, about 300 mL, or about 400 mL. However, larger or smaller volumes are also possible, such as, for example, about 130 mL, if the MCB is designed to provide reconstituted volumes of about 500 mL to about 800 mL only.

As mentioned before, the vitamin formulation and/or the trace element formulation will generally be provided in relatively small chambers, containing from about 2.5 mL to about 100 mL of the formulation. Typically, said chambers will have a volume of from about 10 to about 30 mL. As mentioned before, the volume of the small and large chambers within the MCB can be changed without changing the location of the filling tubes by varying their height without changing their width.

The flexible multi-chamber container (MCB) according to the invention will preferably have a reconstituted volume of from about 600 mL to about 2200 mL, even though smaller or larger volumes are feasible and do not deviate from the invention. Typical reconstituted volumes are, for example, in the range of from about 1000 mL to about 2000 mL, such as, for example, about 1000 mL, about 1300 mL, about 1500 mL, about 1800 mL or about 2000 mL. Smaller reconstituted volumes are, for example, about 620 mL, about 680 mL or about 720 mL.

Multi-chamber containers that can be adapted according to the invention are disclosed, for example, in EP0790051A2, US20160000652A1, and in US20090166363A1. For example, the multi-chamber container may be configured as a bag that includes three adjacent chambers or compartments for the macronutrient formulations and another two or three adjacent chambers for the micronutrients, such as, for example, schematically shown in FIGS. 1-7. In the preferred embodiment, the peelably sealing walls (e.g., frangible barriers or openable seals, peel seals or frangible seals) are used to separate the chambers of the multi-chamber container. The peelably sealing walls permit formulations to be separately stored and admixed just prior to administration thereby allowing storage in a single container of formulations which should not be stored as an admixture for an extended period. Opening of the peelably sealing walls allows communication between the chambers and mixing of the contents of the respective chambers. The outside seals of the multi-chamber container are non-peelably sealing walls that do not open under the fluid pressure supplied or the physical force (e.g., rolling the top edge) to open the weaker peelably sealing walls between the chambers. A multi-chamber container according to the invention can have filling ports that allow filling of the chambers with the respective formulations during manufacture. Providing a medical port will allow addition of drugs, such as, for example, antibiotics, to the reconstituted solution. According to the invention, such medical port may also be absent. A port for administration is provided in the MCB for allowing administering the reconstituted solution. The container should preferably provide a hanger portion for hanging the container, for example to an IV pole.

The multi-chamber container may be provided with instructions explaining a desired order with which to open the peel seals, so that constituent fluids are mixed in a desired order. The unsealing strengths of the respective peel seals may be varied to promote the opening of the seals in the desired order. For example, the unsealing strength of the peel seal to be opened first may be adjusted to first admix the amino acid, lipid and glucose solution before the unsealing strength required to open the peel seal to be opened second.

The flexible multi-chamber bag of the invention is a sterilized product. In the context of the invention, the term "sterilized" relates to a solution that has undergone a process of sterilization. Sterilization refers to any process that eliminates, removes, kills, or deactivates all forms of life (in particular referring to microorganisms such as fungi, bacteria, viruses, spores, unicellular eukaryotic organisms such as Plasmodium, etc.) and other biological agents like prions present in a specific surface, object or fluid, for example food or biological culture media. Sterilization can be achieved through various means, including heat, chemicals, irradiation, high pressure, and filtration. Sterilization is distinct from disinfection, sanitization, and pasteurization, in that those methods reduce rather than eliminate all forms of life and biological agents present. After sterilization, an object is referred to as being sterile or aseptic.

According to one embodiment of the invention, sterilization is done by heat. According to another embodiment of the invention, methods encompass sterilization with moist heat. The term "moist heat" as used herein includes the use of saturated steam with or without pressure, steam air or water spray sterilization. According to one embodiment of the invention, sterilization with moist heat is preferable. Generally, said sterilization with moist heat can be used for drug products, medical devices, plastic bags and other single-use equipment, glass containers, surgical dressings and more.

In the context of the invention, the multi-chamber container can be terminally sterilized by superheated water sterilization methods. Such methods include, for example, water cascade sterilization and water spray sterilization, including methods employing serial tower continuous sterilization equipment. Superheated water is liquid water under pressure at temperatures between the usual boiling point, 100° C. (212° F.) and the critical temperature, 374° C. (705° F.). It is also known as "subcritical water" or "pressurized hot water." Superheated water is stable because of overpressure that raises the boiling point, or by heating it in a sealed vessel with a headspace, where the liquid water is in equilibrium with vapor at the saturated vapor pressure. Superheated water cascade systems are also very useful for terminally sterilizing the product of the invention. Such systems enable liquids in closed receptacles made of glass or other temperature-resistant materials (such as flexible bags used in the context of the present invention) to be sterilized quickly, reliably and gently. The advantage of the hot water cascade system lies in its very short cycle times, which are achieved through a high circulation rate and cascade density in combination with short heating up and cooling down times.

It is one aspect of the present invention, that the MCB according to the invention undergoes a terminal heat sterilization process that ensures a sterility corresponding to the sterility that is achieved by exposition to a sterilization temperature of 121° C. for 8 minutes. In the context of the invention, a heat sterilization process with an F0 of at least 8 minutes is to be understood as a sterilization process that ensures a sterility corresponding to the sterility that is achieved by exposition to a sterilization temperature of 121° C. for 8 minutes. An F0 value of 8 minutes is understood as referring to 8 minutes exposition to 121° C., meaning that the solution is at a temperature of 121° C. for 8 minutes.

Accordingly, the MCB of the invention and the formulations comprised therein, including heat sensitive components, such as, for example, vitamin B12, may be sterilized by exposing/heating the solution to a temperature that is different from 121° C., but the product requires to have a sterility level that corresponds to at least F0=8 minutes in order to be considered sterile in the context of the invention.

In a preferred embodiment, the multi-chamber container for parenteral nutrition according to the invention is sterilized by moist-heat sterilization, specifically by a superheated water sterilization method. In particular, the use of superheated water sterilization methods, water cascade or water spray sterilization with a serial tower continuous sterilization equipment are preferred methods in the context of the invention, since it was found that the methods can be adjusted for applying low F0/C0 ratios to minimize the total heat-exposure of the formulation containing heat-sensitive components such as, for example, vitamin B12, thereby reducing a loss of the vitamin during sterilization and subsequent storage.

According to one aspect of the invention, the sterilization process that has been applied to the vitamin B12 formulation as part of a multi-chamber bag according to the invention has a C0 value of no more than 130 minutes, preferably no more than 120 minutes, no more than 115 minutes, no more than 110 minutes, no more than 100 minutes, no more than 90 minutes, no more than 80 minutes, no more than 70 minutes, no more than 60 minutes, no more than 50 minutes and no more than 40 minutes. As used herein, the C0 value can be understood as the time (in minutes) during which the vitamin B12 formulation is at a temperature of 100° C. or more during the sterilization process. In general, C0 is a physical parameter used to quantify the total heat consumption of a sample.

According to one aspect of the invention, the F0/C0 ratio of the sterilization process is not less than 0.08, more preferably not less than 0.1. In embodiments, the formulation comprising vitamin B12 underwent a sterilization process with a F0/C0 ratio of 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.32, 0.34, 0.36, 0.38, 0.4, 0.44, 0.48, 0.52, 0.56, 0.6, 0.65, 0.7, 0.75, 0.8, 0.9 or ideally almost 1.0.

The flexible MCB of the invention is specifically designed for parenteral administration. Parenteral nutrition (PN) is the feeding of specialist nutritional products to a person intravenously, bypassing the usual process of eating and digestion. It is called total parenteral nutrition (TPN) or total nutrient admixture (TNA) when no significant nutrition is obtained by other routes, and partial parenteral nutrition (PPN) when nutrition is also partially enteric or oral. It may be called peripheral parenteral nutrition (PPN) when administered through vein access in a limb rather than through a central vein as central venous nutrition (CVN). The formulation provided by the present invention is especially suitable for CVN. Enteral food administration is via the human gastrointestinal tract and contrasts with parenteral administration.

The disclosure provides methods of treating patients who require parenteral nutrition when oral and enteral nutrition is not possible, insufficient, or contraindicated. The methods involve using the multi-chamber containers, the "all-in-one" parenteral nutrition system and reconstituted formulations disclosed herein. In particular, the methods involve parenterally administering the contents of a multi-chamber container and/or lipid formulations as disclosed herein to a patient. In a preferred embodiment, the patients are adult or adolescent patients but can be adjusted as well to the needs of pediatric patients. Pediatric patients encompass pre-term babies as well as neonates (from birth through the first 28 days of life), infants (29 days to less than 2 years) and children (2 years to less than 12 years).

As described above, the flexible MCB of the invention provides macronutrients and micronutrients in a ready-to-use format without the need to add any micronutrients before administration in order to address the needs of the patient and meet the applicable guidelines for parenteral nutrition. Accordingly, the MCB of the invention and the parenteral formulation that is reconstituted therefrom by removing or rupturing the peelably sealing walls (e.g., rolling the top edge) can be advantageously used both in a hospital or home setting. The MCB of the invention and the parenteral formulation that is reconstituted therefrom can be used broadly for patients who require parenteral nutrition, including patients that require total or partial parenteral nutrition.

The invention claimed is:

1. A flexible multi-chamber bag for storing and reconstituting parenteral nutrition solutions, the flexible multi-chamber bag comprising:

two polymer films edge-sealed to form a first bag having a top edge, a bottom edge, a left edge and a right edge, wherein the top edge, the bottom edge, the left edge and the right edge are non-peelably sealed;

a first plurality of tubes with sidewalls non-peelably sealed between the two polymer films at the top edge to form a first plurality of port tubes;

a second plurality of tubes with sidewalls non-peelably sealed between the two polymer films at the bottom edge to form a second plurality of port tubes;

a first peelably sealing wall and a second peelably sealing wall between the two polymer films extending from the top edge to the bottom edge and separating the first bag into a first chamber between the first peelably sealing wall and the second peelably sealing wall, a first space between the left edge and the first peelably sealing wall, a second space between the second peelably sealing wall and the right edge;

a third peelably sealing wall extending from the left edge to the first peelably sealing wall to separate the first space to form a third chamber and a fourth chamber; and a fourth peelably sealing wall extending from the right edge to the second peelably sealing wall to separate the second space to form a second chamber and a fifth chamber, wherein the flexible multi-chamber bag comprises a first portion near the top edge comprising the first plurality of port tubes, and the first portion is non-peelably sealed and removed from the flexible multi-chamber bag.

2. The flexible multi-chamber bag of claim 1, wherein the third peelably sealing wall comprises a fifth peelably sealing wall starting from an inner surface of the left edge and a sixth peelably sealing wall starting from the first peelably sealing wall, and both the fifth peelably sealing wall and the sixth peelably sealing wall connect at a first connection point to form the third peelably sealing wall.

3. The flexible multi-chamber bag of claim 2, wherein the left edge and the fifth peelably sealing wall have an angle greater than 90° toward the top edge direction, and the fifth peelably sealing wall and the sixth peelably sealing wall around the first connection point have an angle in the range between 130° and 170°.

4. The flexible multi-chamber bag of claim 3, wherein the left edge and the fifth peelably sealing wall have the angle of about 100° toward the top edge direction, and the fifth peelably sealing wall and the sixth peelably sealing wall around the first connection point have an angle in the range between 150° and 160°.

5. The flexible multi-chamber bag of claim 3, wherein the left edge and the fifth peelably sealing wall have the angle of 102° toward the top edge direction, and the fifth peelably sealing wall and the sixth peelably sealing wall around the first connection point have an angle of 156°.

6. The flexible multi-chamber bag of claim 1, wherein a seventh peelably sealing wall starts from a first connection point and extends to the bottom edge to separate the fourth chamber to form a sixth chamber between the seventh peelably sealing wall and the first peelably sealing wall.

7. The flexible multi-chamber bag of claim 1, wherein the fourth peelably sealing wall comprises an eighth peelably sealing wall starting from an inner surface of the right edge and a ninth peelably sealing wall starting from the second peelably sealing wall, and both the eighth peelably sealing wall and the ninth peelably sealing wall connect at a second connection point to form the fourth peelably sealing wall.

8. The flexible multi-chamber bag of claim 7, wherein the right edge and the eighth peelably sealing wall have an angle greater than 90° toward the top edge direction, and the eighth peelably sealing wall and the ninth peelably sealing wall around the second connection point have an angle in the range between 130° and 170°.

9. The flexible multi-chamber bag of claim 8, wherein the right edge and the eighth peelably sealing wall have the angle of about 100° toward the top edge direction, and the eighth peelably sealing wall and the ninth peelably sealing wall around the second connection point have an angle in the range between 150° and 160°.

10. The flexible multi-chamber bag of claim 9, wherein the right edge and the eighth peelably sealing wall have the angle of 102° toward the top edge direction, and the eighth peelably sealing wall and the ninth peelably sealing wall around the second connection point have an angle of 156°.

11. The flexible multi-chamber bag of claim 1, wherein at least one of the first chamber, the second chamber and the third chamber connects to the first plurality of port tubes.

12. The flexible multi-chamber bag of claim 1, wherein each of the first chamber, the second chamber and the third chamber connects to the first plurality of port tubes.

13. The flexible multi-chamber bag of claim 1, wherein at least one of the fourth chamber and the fifth chamber connects to the second plurality of port tubes.

14. The flexible multi-chamber bag of claim 1, wherein each of the fourth chamber and the fifth chamber connects to the second plurality of port tubes.

15. The flexible multi-chamber bag of claim 1, wherein the first chamber connects to an administration port and/or a medication port at the bottom edge.

16. The flexible multi-chamber bag of claim 1, wherein the first chamber connects to both an administration port and a medication port at the bottom edge.

17. The flexible multi-chamber bag of claim 1, wherein the flexible multi-chamber bag comprises a second portion at the left corner of the flexible multi-chamber bag, the second portion comprises the port tube to the fourth chamber, and the second portion is non-peelably sealed and removed from the flexible multi-chamber bag.

18. The flexible multi-chamber bag of claim 1, wherein the flexible multi-chamber bag comprises a third portion at the right corner of the flexible multi-chamber bag, the third portion comprises the port tube to the fifth chamber, and the third portion is non-peelably sealed and removed from the flexible multi-chamber bag.

19. An "all-in-one" parenteral nutrition system comprising parenteral nutrition solutions in the flexible multi-chamber bag of claim 1, the "all-in-one" parenteral nutrition system comprising:

the first chamber comprising an amino acids solution;

the second chamber comprising a glucose solution;

the third chamber comprising a lipid emulsion;

the fourth chamber comprising a vitamins solution or emulsion; and the fifth chamber comprising a trace elements solution.

20. The "all-in-one" parenteral nutrition system of claim 19, wherein the first chamber further comprises vitamins or trace elements.

21. The "all-in-one" parenteral nutrition system of claim 19, wherein the second chamber further comprises vitamins or trace elements.

22. The "all-in-one" parenteral nutrition system of claim 19, wherein the third chamber further comprises fat-soluble vitamins.

23. The "all-in-one" parenteral nutrition system of claim 19, wherein each of the first chamber, the second chamber, the third chamber, the fourth chamber and the fifth chamber comprise one port tube for addition of contents into the chambers.

24. The "all-in-one" parenteral nutrition system of claim 23, wherein the port tube for each of the third chamber, the fourth chamber and the fifth chamber is sealed or closed after the addition of the contents into the chambers.

25. The "all-in-one" parenteral nutrition system of claim 24, wherein port-tube-containing portions for the fourth chamber and the fifth chamber are non-peelably sealed and removed from the rest of the flexible multi-chamber bag.

26. The "all-in-one" parenteral nutrition system of claim 19, wherein the first portion comprises at least one port tube at the top edge for the first chamber, the second chamber and/or the third chamber.

* * * * *